United States Patent
Kim et al.

(10) Patent No.: US 10,659,126 B2
(45) Date of Patent: May 19, 2020

(54) METHOD FOR FEEDING BACK CSI INFORMATION IN WIRELESS COMMUNICATION SYSTEM AND DEVICE THEREFOR

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kungmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/558,150

(22) PCT Filed: Jul. 27, 2015

(86) PCT No.: PCT/KR2015/007791
§ 371 (c)(1),
(2) Date: Sep. 13, 2017

(87) PCT Pub. No.: WO2016/148352
PCT Pub. Date: Sep. 22, 2016

(65) Prior Publication Data
US 2018/0076870 A1    Mar. 15, 2018

Related U.S. Application Data

(60) Provisional application No. 62/132,517, filed on Mar. 13, 2015.

(51) Int. Cl.
*H04B 7/06* (2006.01)
*H04B 7/04* (2017.01)
(Continued)

(52) U.S. Cl.
CPC ............ *H04B 7/0626* (2013.01); *H04B 7/04* (2013.01); *H04B 7/0478* (2013.01); *H04B 7/06* (2013.01);
(Continued)

(58) Field of Classification Search
CPC .......... H04B 7/04; H04B 7/0478; H04B 7/06; H04B 7/0617; H04B 7/0626;
(Continued)

(56) References Cited

U.S. PATENT DOCUMENTS

2012/0320778 A1    12/2012 Lv et al.
2013/0070720 A1*   3/2013 Pan ..................... H04B 7/0626
                                              370/329
(Continued)

OTHER PUBLICATIONS

PCT International Application No. PCT/KR2015/007791, Written Opinion of the International Searching Authority dated Dec. 11, 2015, 22 pages.
(Continued)

*Primary Examiner* — Hicham B Foud
(74) *Attorney, Agent, or Firm* — Lee Hong Degerman Kang Waimey

(57) ABSTRACT

A method and device for feeding back channel state information (CSI) by a user equipment (UE) in a wireless communication system applied three-dimensional (3D) beamforming. The method includes: receiving a pilot signal (reference signal) from a base station; configuring a CSI transmission mode in one of a first transmission mode and a second transmission mode based on motion information of the UE; and feeding back the CSI based on the configured CSI transmission mode. The first transmission mode transmits the CSI including precoding matrix index (PMI) information for one of vertical beamforming or horizontal beamforming. The second transmission mode transmits the CSI
(Continued)

including PMI information for both vertical beamforming and horizontal beamforming.

11 Claims, 23 Drawing Sheets

(51) Int. Cl.
- *H04B 7/0456* (2017.01)
- *H04L 5/00* (2006.01)
- *H04W 72/04* (2009.01)
- *H04B 7/00* (2006.01)

(52) U.S. Cl.
CPC ......... *H04B 7/0617* (2013.01); *H04B 7/0632* (2013.01); *H04B 7/0639* (2013.01); *H04L 5/0048* (2013.01); *H04L 5/0051* (2013.01); *H04L 5/0053* (2013.01); *H04L 5/0057* (2013.01); *H04W 72/0413* (2013.01); *H04L 5/0023* (2013.01)

(58) Field of Classification Search
CPC ... H04B 7/0632; H04B 7/0639; H04L 5/0048; H04W 72/0413
See application file for complete search history.

(56) References Cited

U.S. PATENT DOCUMENTS

| | | | | |
|---|---|---|---|---|
| 2013/0308715 A1* | 11/2013 | Nam | ................... | H04B 7/0469 375/267 |
| 2013/0336214 A1* | 12/2013 | Sayana | ................... | H04B 7/024 370/328 |
| 2014/0003240 A1 | 1/2014 | Chen et al. | | |
| 2014/0098689 A1* | 4/2014 | Lee | ...................... | H04B 7/0469 370/252 |
| 2015/0222335 A1* | 8/2015 | Jing | ..................... | H04B 7/0469 375/267 |
| 2016/0065278 A1* | 3/2016 | Wang | ................... | H04B 7/0456 375/267 |
| 2016/0164588 A1* | 6/2016 | Chen | ................... | H04B 7/0469 375/267 |
| 2016/0191131 A1* | 6/2016 | Balraj | ................. | H04B 7/0617 375/267 |
| 2016/0380734 A1* | 12/2016 | Wang | ................... | H04L 5/0057 370/329 |
| 2017/0005712 A1* | 1/2017 | Jiang | .................... | H04B 7/0413 |
| 2017/0244462 A1* | 8/2017 | Wei | ...................... | H04B 7/0469 |
| 2017/0331535 A1* | 11/2017 | Wei | ...................... | H04B 7/0469 |
| 2017/0353222 A1* | 12/2017 | Wei | ...................... | H04B 7/0469 |

OTHER PUBLICATIONS

Texas Instruments, "PUCCH Mode 1-1 for Rel. 10 Double-Codebook Precoding", 3GPP TSG RAN WG1 Meeting #62bis, R1-105285, Oct. 2010, 10 pages.

LG Electronics et al., "Remaining Details in PUCCH Reporting Modes", 3GPP TSG RAN WG1 Meeting #63, R1-106108, Nov. 2010, 7 pages.

Catt, "Discussion on aggregated PMI feedback", 3GPP TSG RAN WG1 Meeting #68bis, R1-121087, Mar. 2012, 2 pages.

* cited by examiner

FIG. 2
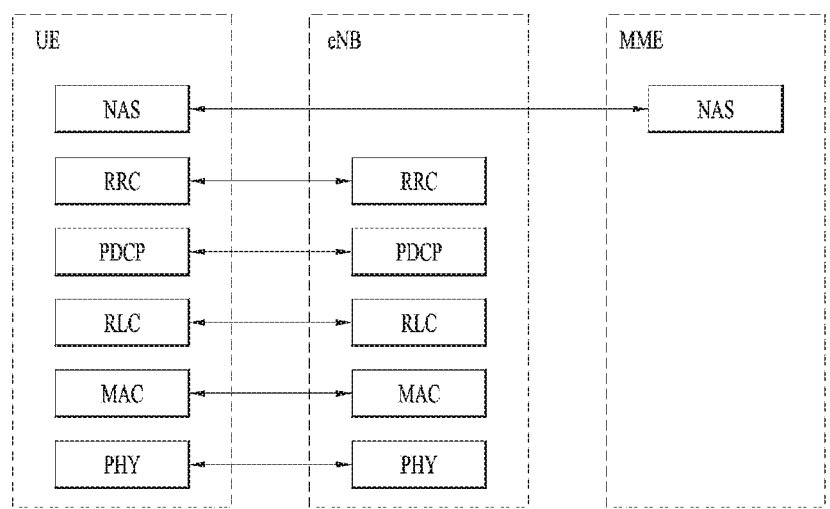
(a) Control-Plane Protocol Stack
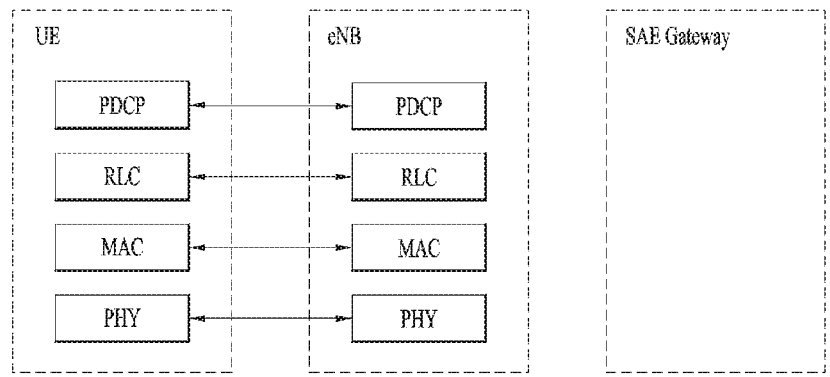
(b) User-Plane Protocol Stack

☒ : DMRS GROUP 1
☒ : DMRS GROUP 2

(a) CONVENTIONAL ANTENNA SYSTEM        (b) AAS

FIG. 16
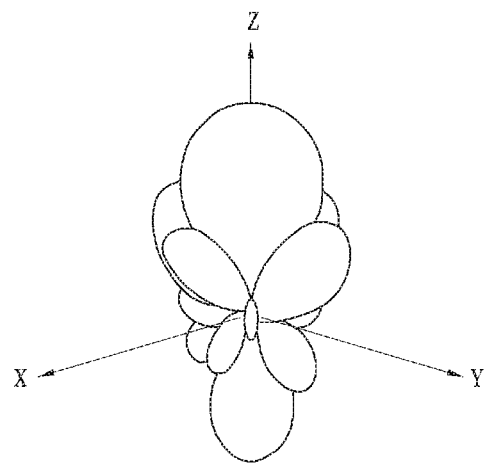
(a) 16Tx @ 2GHz
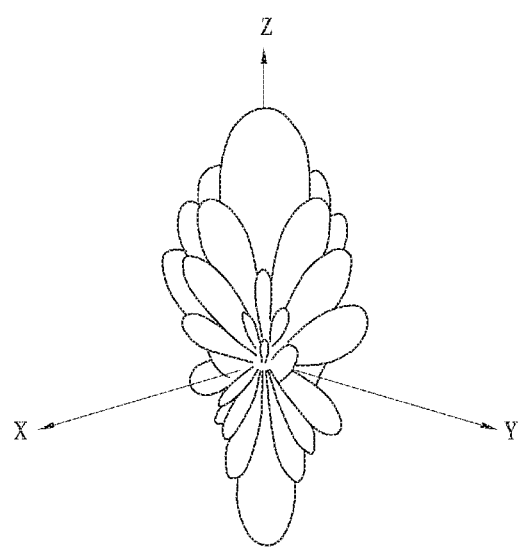
(b) 64Tx @ 2GHz

METHOD FOR FEEDING BACK CSI INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/007791, filed on Jul. 27, 2015, which claims the benefit of U.S. Provisional Application No. 62/132,517, filed on Mar. 13, 2015, the contents of which are all hereby incorporated by reference herein in their entirety.

TECHNICAL FIELD

The present invention relates to a wireless communication system and, more particularly, to a method of feeding back channel state information (CSI) in a wireless communication system, to which 3D beamforming is applied, and a device therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention is to provide a method of feeding back channel state information (CSI) in a wireless communication system and a device therefor.

Another object of the present invention is to provide a method of feeding back CSI based on a vertical domain and a horizontal domain when 3D beamforming is applied to a wireless communication system.

Another object of the present invention is to provide a method of configuring a CSI feedback mode and included information when 3D beamforming is applied to a wireless communication system.

Technical Solution

The object of the present invention can be achieved by providing a method of, at a user equipment (UE), feeding back channel state information (CSI) in a wireless communication system, to which three-dimensional (3D) beamforming is applied including receiving a pilot signal (reference signal) from a base station, configuring CSI transmission mode, and feeding back the CSI based on the configured CSI transmission mode, wherein the CSI transmission mode includes a first transmission mode in which precoding matrix index (PMI) information for any one of vertical beamforming and horizontal beamforming is included and transmitted in the CSI and a second transmission mode in which PMI information for both vertical beamforming and horizontal beamforming is included and transmitted in the CSI, and the CSI is fed back in any one of the first transmission mode and the second transmission mode.

In another aspect of the present invention, provided herein is a user equipment (UE) device for feeding back channel state information (CSI) in a wireless communication system, to which three-dimensional (3D) beamforming is applied including a reception module configured to receive information from an external device, a transmission module configured to transmit information to an external device, and a processor configured to control the reception module and the transmission module, wherein the processor receives a pilot signal (reference signal) from a base station using the reception module; configures CSI transmission mode; and feeds back the CSI based on the configured CSI transmission mode using the transmission module, and wherein the CSI transmission mode includes a first transmission mode in which precoding matrix index (PMI) information for any one of vertical beamforming and horizontal beamforming is included and transmitted in the CSI and a second transmission mode in which PMI information for both vertical beamforming and horizontal beamforming is included and transmitted in the CSI, and the CSI is fed back in any one of the first transmission mode and the second transmission mode.

In addition, the following matters are commonly applicable to the method of feeding back the CSI and the UE device in the wireless communication system.

In one embodiment of the present invention, the first transmission mode may be any one of a first channel quality indicator (CQI) transmission mode in which a wideband CQI is included and transmitted in the CSI and a second CQI transmission mode in which a UE-selected CQI is included and transmitted in the CSI.

In one embodiment of the present invention, the second transmission mode may be any one of a first channel quality indicator (CQI) transmission mode in which a wideband CQI is included and transmitted in the CSI and a second CQI transmission mode in which a UE-selected CQI is included and transmitted in the CSI.

In one embodiment of the present invention, if a PMI for vertical beamforming is transmitted in the first transmission mode, at least one of a 3D-CQI and a V-CQI may be included in the CSI, and, if a PMI for horizontal beamforming is transmitted in the first transmission mode, at least one of a 3D-CQI and an H-CQI may be included in the CSI.

In one embodiment of the present invention, in the second transmission mode, a 3D-CQI may be always included in the CSI, and a V-CQI and an H-CQI may be selectively included in the CSI.

In one embodiment of the present invention, if a PMI included in the PMI information is transmitted based on the first transmission mode, any one of a first PMI for vertical beamforming and a second PMI for a horizontal direction may be transmitted, and, if a PMI included in the PMI information is transmitted based on the second transmission mode, a first PMI for vertical beamforming and a second PMI for a horizontal direction may be both transmitted.

In one embodiment of the present invention, the first PMI and the second PMI may be portions of a single PMI, the first transmission mode may be a transmission mode in which a portion of the single PMI is fed back in consideration of a beamforming direction, and the second transmission mode may be a transmission mode in which the single PMI is transmitted.

In one embodiment of the present invention, the CSI may be periodically fed back through a physical uplink control channel (PUCCH) or may be aperiodically fed back through a physical uplink shared channel (PUSCH).

Advantageous Effects

According to the present invention, it is possible to provide a method of feeding back CSI in a wireless communication system and a device therefor.

According to the present invention, it is possible to provide a method of feeding back CSI based on a vertical domain and a horizontal domain when 3D beamforming is applied to a wireless communication system.

According to the present invention, it is possible to provide a method of configuring a CSI feedback mode and included information when 3D beamforming is applied to a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

FIG. 16 is a diagram showing the shape of a beam according to the number of transmit antennas according to an embodiment of the present invention;

BEST MODE

Figure 1:
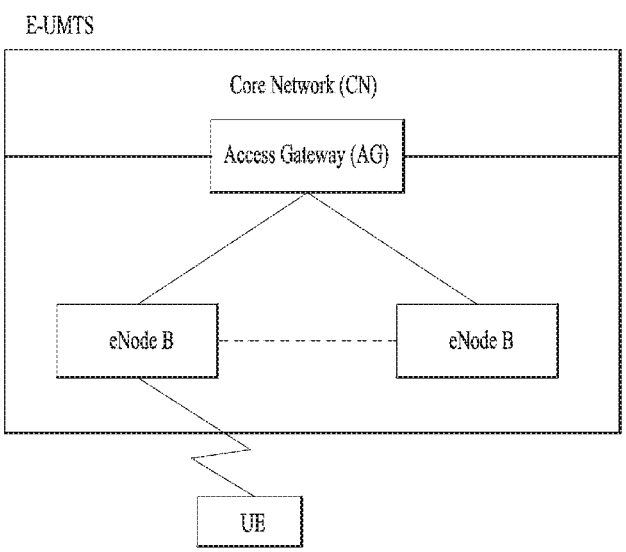
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
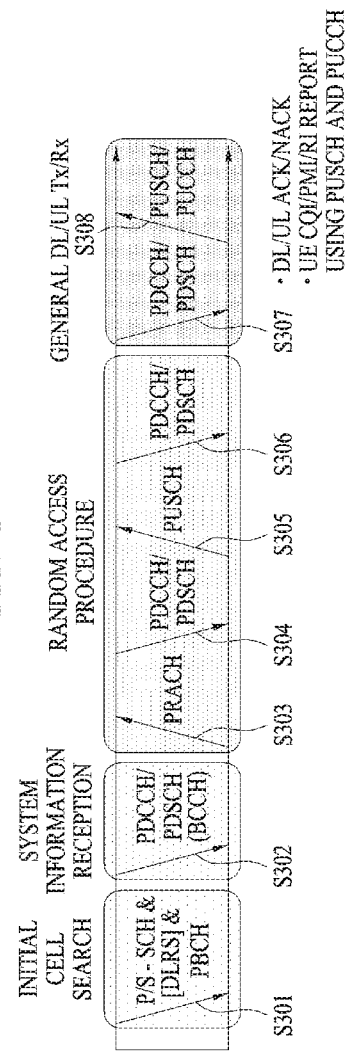
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
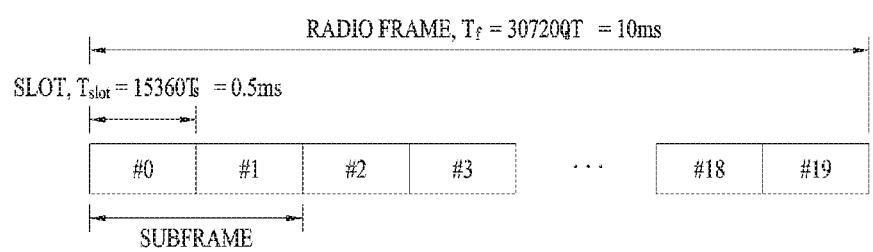
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
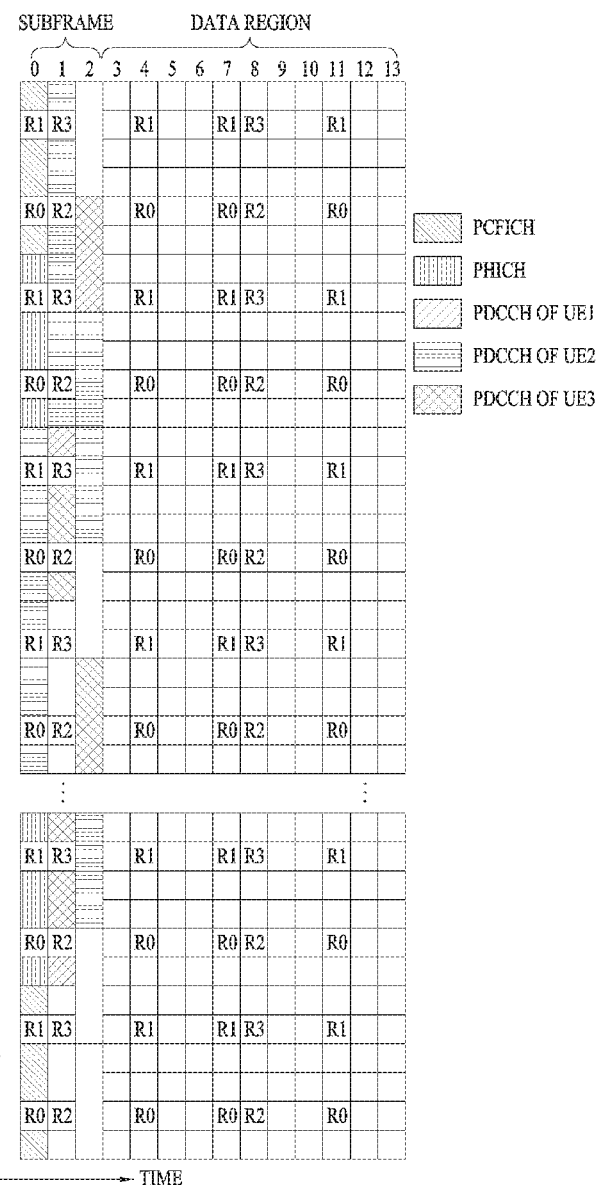
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
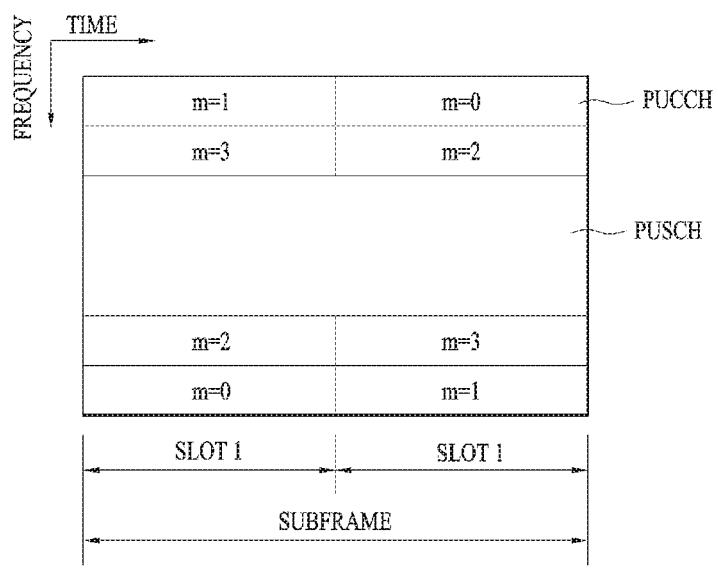
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
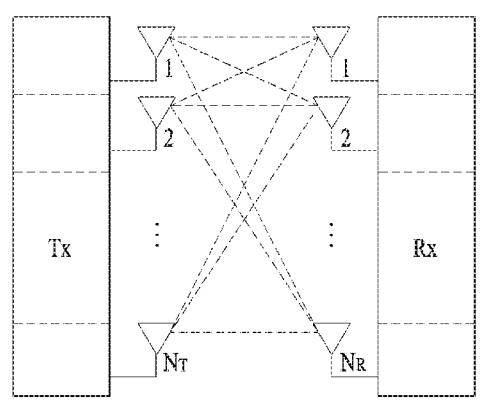
FIG. 7 illustrates a configuration of a general Multiple Input Multiple Output (MIMO) communication system.

FIG. 7 illustrates the configuration of a typical MIMO communication system. Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \qquad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1 W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{ (if rank} = r\text{),}$$

where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown in Equation 10 below.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N^T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
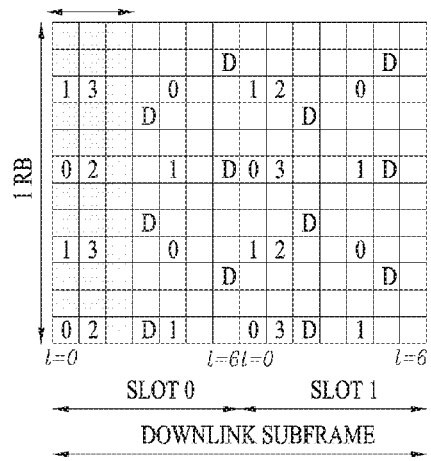
FIGS. 8 and 9 illustrate downlink Reference Signal (RS) configurations in an LTE system supporting downlink transmission through four antennas (4-Tx downlink transmission)
Figure 9:
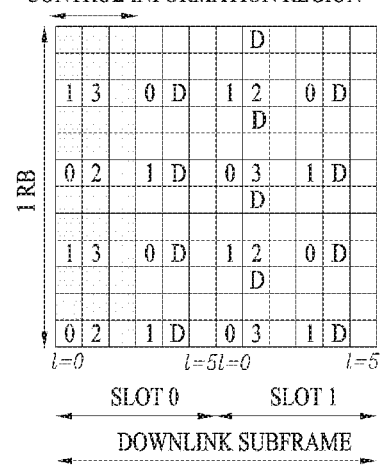

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
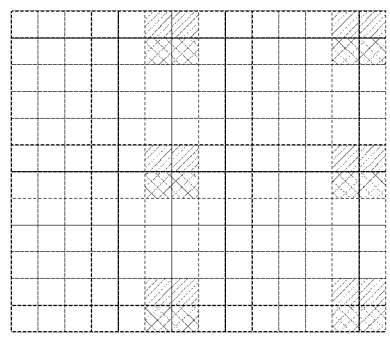
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | | | Number of CSI reference signals configured | | | | | |
|---|---|---|---|---|---|---|---|---|
| CSI reference signal | | 1 or 2 | | 4 | | 8 | | |
| | configuration | (k', l') | $n_s$ mod 2 | (k', l') | $n_s$ mod 2 | (k', l') | $n_s$ mod 2 | |
| Frame structure type 1 and 2 | 0 | (9, 5) | 0 | (9, 5) | 0 | (9, 5) | 0 | |
| | 1 | (11, 2) | 1 | (11, 2) | 1 | (11, 2) | 1 | |
| | 2 | (9, 2) | 1 | (9, 2) | 1 | (9, 2) | 1 | |
| | 3 | (7, 2) | 1 | (7, 2) | 1 | (7, 2) | 1 | |
| | 4 | (9, 5) | 1 | (9, 5) | 1 | (9, 5) | 1 | |
| | 5 | (8, 5) | 0 | (8, 5) | 0 | | | |
| | 6 | (10, 2) | 1 | (10, 2) | 1 | | | |
| | 7 | (8, 2) | 1 | (8, 2) | 1 | | | |
| | 8 | (6, 2) | 1 | (6, 2) | 1 | | | |
| | 9 | (8, 5) | 1 | (8, 5) | 1 | | | |
| | 10 | (3, 5) | 0 | | | | | |
| | 11 | (2, 5) | 0 | | | | | |
| | 12 | (5, 2) | 1 | | | | | |
| | 13 | (4, 2) | 1 | | | | | |
| | 14 | (3, 2) | 1 | | | | | |
| | 15 | (2, 2) | 1 | | | | | |
| | 16 | (1, 2) | 1 | | | | | |
| | 17 | (0, 2) | 1 | | | | | |
| | 18 | (3, 5) | 1 | | | | | |
| | 19 | (2, 5) | 1 | | | | | |
| Frame structure type 2 only | 20 | (11, 1) | 1 | (11, 1) | 1 | (11, 1) | 1 | |
| | 21 | (9, 1) | 1 | (9, 1) | 1 | (9, 1) | 1 | |
| | 22 | (7, 1) | 1 | (7, 1) | 1 | (7, 1) | 1 | |
| | 23 | (10, 1) | 1 | (10, 1) | 1 | | | |
| | 24 | (8, 1) | 1 | (8, 1) | 1 | | | |
| | 25 | (6, 1) | 1 | (6, 1) | 1 | | | |
| | 26 | (5, 1) | 1 | | | | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
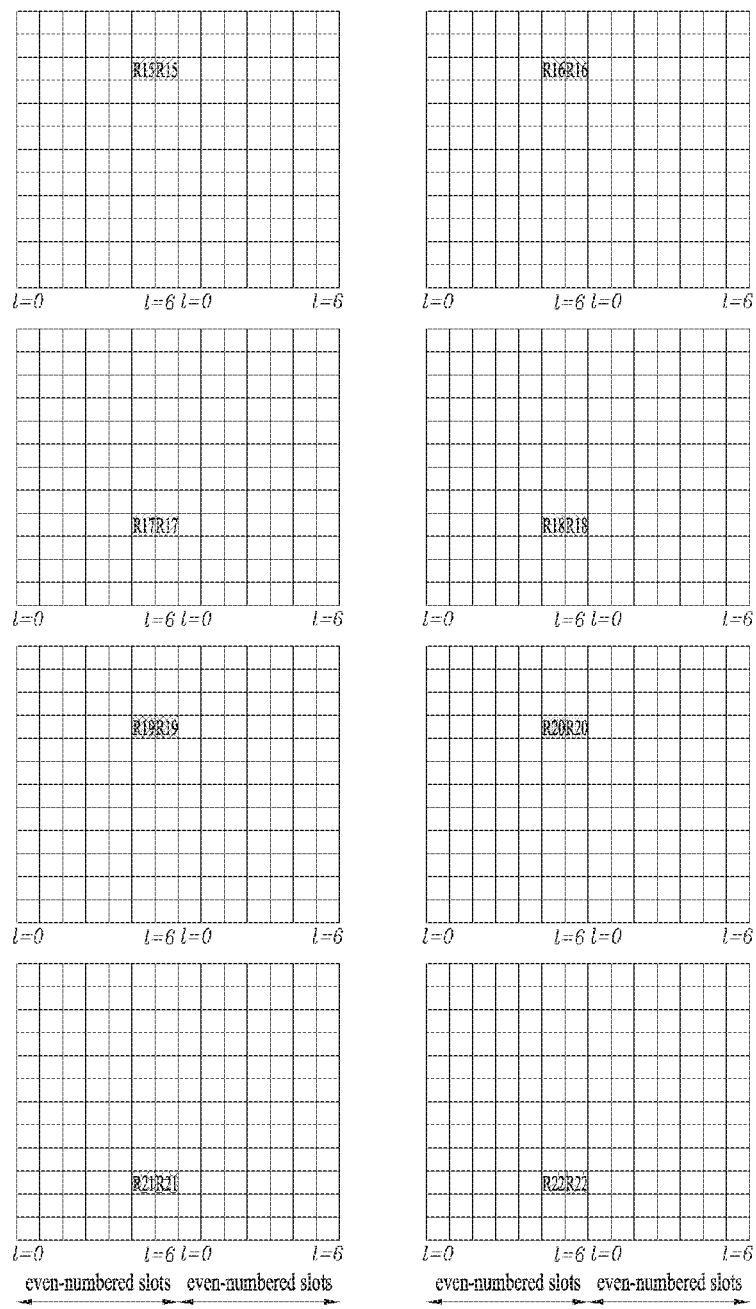
FIG. 11 illustrates Channel State Information-Reference Signal (CSI-RS) configuration #0 of downlink CSI-RS configurations defined in a current 3GPP standard specification.

In [Table 1] and [Table 2], (k',l') represents an RE index where k' is a subcarrier index and l' is an OFDM symbol index. FIG. 11 illustrates CSI-RS configuration #0 of DL CSI-RS configurations defined in the current 3GPP standard. In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 5 |
| 35-74 | 40 | $I_{CSI-RS}$ − 35 |
| 75-154 | 80 | $I_{CSI-RS}$ − 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=           SEQUENCE {
    csi-RS-r10                  CHOICE {
        ...
```

TABLE 4-continued

```
     }
     zeroTxPowerCSI-RS-r10           CHOICE {
         release                     NULL,
         setup                       SEQUENCE {
             zeroTxPowerResourceConfigList-r10    BIT STRING
(SIZE (16)),
             zeroTxPowerSubframeConfig-r10        INTEGER
(0..154)
         }
     }
}
-- ASN1STOP
```

The current 3GPP standard defines modulation orders and cording rates for respective CQI indexes as illustrated in [Table 5].

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
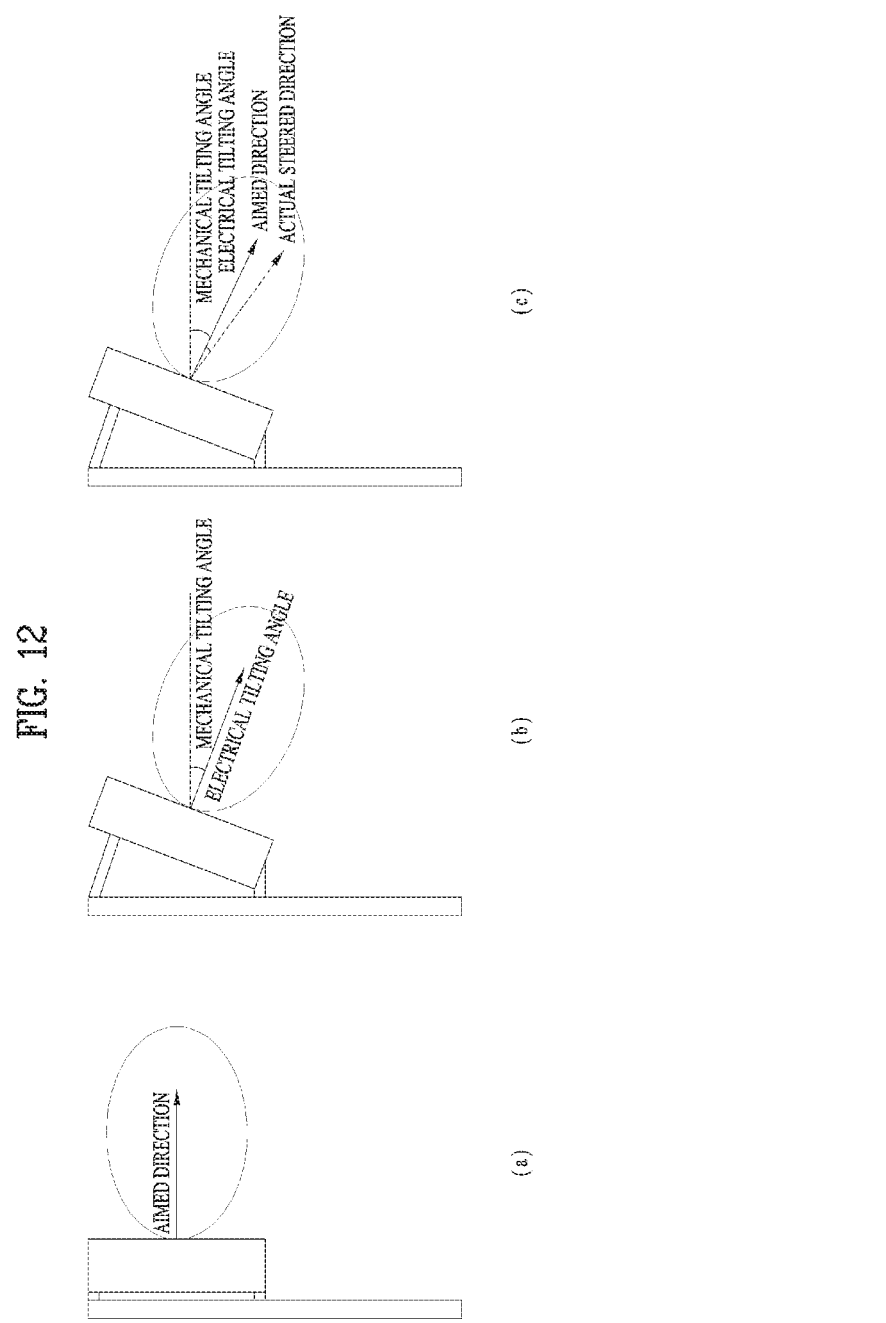
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical titling are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
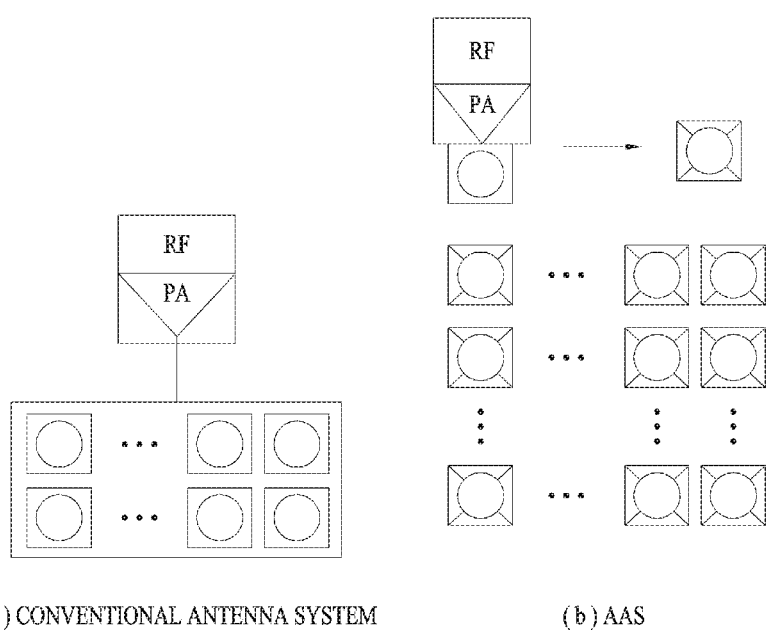
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
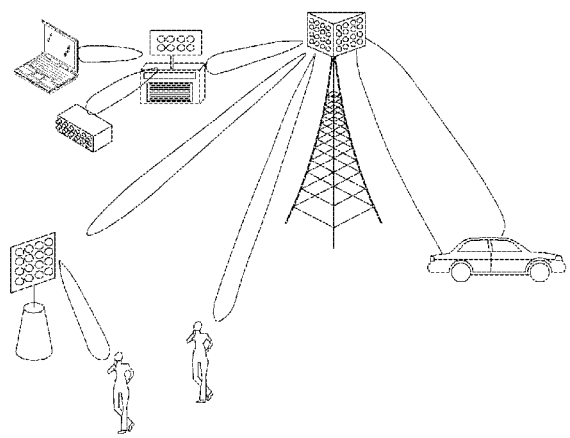
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
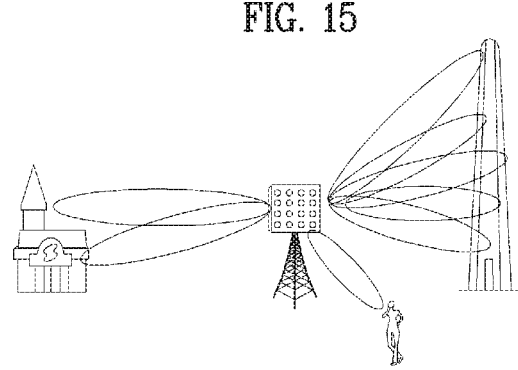
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Now a description will be given of a MIMO system using linear precoding. A DL MIMO system may be modeled as [Equation 11] in frequency units (e.g. a subcarriers) that are assumed to experience flat fading in the frequency domain in a narrow band system or a wideband system.

$$y = Hx + z \quad \text{[Equation 11]}$$

If the number of Rx antenna ports at a UE is $N_r$ and the number of Tx antenna eNB is ports at an eNB is $N_t$, y is an $N_r \times 1$ signal vector received at the $N_r$ Rx antennas of the UE, H is a MIMO channel matrix of size $N_r \times N_t$, x is $N_t \times 1$ transmission signals, and z is an $N_r \times 1$ received noise and interference vector in [Equation 11].

The above system model is applicable to a multi-user MIMO scenario as well as a single-user MIMO scenario. While $N_r$ is the number of Rx antennas at the single UE in the single-user MIMO scenario, $N_r$ may be interpreted as the total number of Rx antennas at multiple UEs in the multi-user MIMO scenario.

The above system model is applicable to a UL transmission scenario as well as a DL transmission scenario. Then, $N_t$ may represent the number of Tx antennas at the UE and $N_r$ may represent the number of Rx antennas at the eNB.

In the case of a linear MIMO precoder, the MIMO precoder may be generally represented as a matrix U of size $N_t \times N_s$ where $N_s$ is a transmission rank or the number of transmission layers. Accordingly, the transmission signal vector x may be modeled as [Equation 12].

$$x = \sqrt{\frac{P_T}{N_s}} Us \quad \text{[Equation 12]}$$

where $P_T$ is transmission signal energy and s is an $N_s \times 1$ transmission signal vector representing signals transmitted in $N_s$ transmission layers. That is, $E\{s^H U^H Us\} = N_s$. Let $N_t \times 1$ precoding vectors corresponding to the $N_s$ transmission layers be denoted by $u_1, \ldots, u_{N_s}$. Then $U=[u_1 \ldots u_{N_s}]$. In this case, [Equation 12] may be expressed as [Equation 13].

$$x = \sqrt{\frac{P_T}{N_s}} \sum_{i=1}^{N_s} u_i s_i \qquad \text{[Equation 13]}$$

where $s_i$ is an ith element of the vector s. Generally, it may be assumed that signals transmitted in different layers are uncorrelated ($E\{s_j^* s_i\}=0 \forall i \neq j$) and the average magnitude of each signal is the same. If it is assumed that the average energy of each signal is 1 ($E\{|s_i|^2\}=1 \forall i$), for the convenience of description, the sum of the energy of the layer precoding vectors is $N_s$ given as [Equation 14].

$$\sum_{i=1}^{N_s} E\{u_i^H u_i\} = N_s \qquad \text{[Equation 14]}$$

If a signal is to be transmitted with the same power in each layer, it is noted from [Equation 14] that $E\{u_i^H u_i\}=1$.

As a future multi-antenna system such as massive MIMO or large-scale MIMO evolves, the number of antennas will increase gradually. In fact, use of up to 64 Tx antennas is considered for an eNB in the LTE standard, taking into account a 3D MIMO environment.

However, as the number of antennas increases, pilot overhead and feedback overhead also increase. As a result, decoding complexity may be increased. Since the size of the MIMO channel matrix H increases with the number of antennas at an eNB, the eNB should transmit more measurement pilots to a UE so that the UE may estimate the MIMO channels. If the UE feeds back explicit or implicit information about the measured MIMO channels to the eNB, the amount of feedback information will increase as the channel matrix gets larger. Particularly when a codebook-based PMI feedback is transmitted as in the LTE system, the increase of antennas in number leads to an exponential increase in the size of a PMI codebook. Consequently, the computation complexity of the eNB and the UE is increased.

In this environment, system complexity and overhead may be mitigated by partitioning total Tx antennas and thus transmitting a pilot signal or a feedback on a sub-array basis. Especially from the perspective of the LTE standard, a large-scale MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an ith layer are denoted by $u_{i,1}, \ldots, u_{i,M}$, the precoding vector for the ith layer may be represented as $u_i = [u_{i,1}^T u_{i,2}^T \ldots u_{i,M}^T]^T$.

Each sub-precoding vector experiences, as effective channels, a sub-channel matrix including Tx antennas in a partition corresponding to the sub-precoding vector, obtained by dividing the $N_r \times N_t$ MIMO channel matrix H by rows. The MIMO channel matrix H is expressed using the sub-channel matrices, as follows.

$$H=[H_1 \ldots H_M] \qquad \text{[Equation 15]}$$

If the UE determines each preferred sub-precoding vector based on a PMI codebook, an operation for normalizing each sub-precoding vector is needed. Normalization refers to an overall operation for processing the value, size, and/or phase of a precoding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an m th partition is normalized with respect to a value of $\alpha_{i,m}$ and the normalized sub-precoding vector or the Normalized Partitioned Precoder (NPP) is $v_{i,m}=u_{i,m}/\alpha_{i,m}$. Therefore, partitioned precoding is modeled as [Equation 16], in consideration of codebook-based precoding.

$$u_i = [\alpha_{i,1} v_{i,1}^T \alpha_{i,2} v_{i,2}^T \ldots \alpha_{i,M} v_{i,M}^T]^T \qquad \text{[Equation 16]}$$

As noted from [Equation 16], the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports) may be defined by defining NPPs for the partitions of antenna ports and linking coefficients that link the NPPs to one another.

M linking coefficients for the ith layer may be defined as a vector $a_i = [\alpha_{i,1} \alpha_{i,2} \ldots \alpha_{i,M}]^T$. Herein, $a_i$ will be referred to as a 'linking vector'.

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as expressed in [Equation 17]. This is because it is assumed in many cases that the first element is already normalized from the perspective of the whole precoding vector $u_i$.

$$\frac{a_i}{\alpha_{i,1}} = \left[1 \ \frac{\alpha_{i,2}}{\alpha_{i,1}} \ \frac{\alpha_{i,3}}{\alpha_{i,3}} \ \ldots \ \frac{\alpha_{i,M}}{\alpha_{i,1}}\right]^T = [1 b_i^T]^T \qquad \text{[Equation 17]}$$

If each of the transmission layers is divided into the same number of partitions, a linking matrix expressed as [Equation 18] may also be defined. An NPP for each partition in the form of a matrix may be defined as [Equation 19].

$$A=[a_1 \ldots a_{N_s}] \qquad \text{[Equation 18]}$$

$$V_m=[v_{1,m} \ldots v_{N_s,m}], m=1, \ldots, M \qquad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an ith layer, $\hat{a}_i = [\alpha_{i,1} \alpha_{i,1} \alpha_{i,1} \alpha_{i,2} \alpha_{i,2} \alpha_{i,2} \alpha_{i,2}]^T$. An extended linking matrix $\hat{A}=[\hat{a}_1 \ldots \hat{a}_{N_s}]$ may be defined by stacking the extended linking vectors.

In this case, the whole precoding matrix may be expressed as a Hadamard product (or element-wise product) between the extended linking matrix and the NPP matrix $V_t$ in [Equation 20].

$$U = \hat{A} \circ V_t \qquad \text{[Equation 20]}$$

where $V_t = [V_1^T \ldots V_M^T]^T$ and the matrix operator $\circ$ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from [Equation 20], one linking precoder may be configured, which should not be construed as limiting the present invention. For example, a plurality of sub-linking vectors may be configured by additional partitioning of the linking vector $a_i$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the relationship that a $\triangleq a_1 = \ldots = a_{N_s}$ is established between the linking vectors. Then the linking precoder may be expressed only with or (M−1) linking coefficients.

MIMO precoding schemes may be categorized largely into closed-loop precoding and open-loop precoding. When a MIMO precoder is configured, channels between a transmitter and a receiver are considered in the closed-loop precoding scheme. Therefore, additional overhead such as transmission of a feedback signal from a UE or transmission of a pilot signal is required so that the transmitter may estimate MIMO channels. If the channels are accurately estimated, the closed-loop precoding scheme outperforms the open-loop precoding scheme. Thus, the closed-loop precoding scheme is used mainly in a static environment experiencing little channel change between a transmitter and a receiver (e.g. an environment with a low Doppler spread and a low delay spread) because the closed-loop precoding scheme requires channel estimation accuracy. On the other hand, the open-loop precoding scheme outperforms the closed-loop precoding scheme in an environment experiencing a great channel change between a transmitter and a receiver because there is no correlation between the channel change between the transmitter and the receiver and a MIMO precoding scheme.

To apply closed-loop precoding to a massive MIMO environment having a large number of antennas, information about each sub-precoder and information about a linking precoder are required. Without codebook-based feedback, the linking precoder information may not be needed. Depending on a partitioning method, effective channels experienced by each sub-precoder may have different characteristics from effective channels experienced by the linking precoder.

For example, one sub-precoder may experience MIMO channels having a relatively low Doppler spread, whereas another sub-precoder may experience MIMO channels having a relatively high Doppler spread. In another example, while all sub-precoders may experience effective channels having similar Doppler characteristics, the linking precoder may experience effective channels having different Doppler characteristics. Hereinafter, a fractional beamforming scheme for adaptively optimizing a MIMO transmission scheme according to partitioned channels and linking channels in the partitioned precoding environment will be described.

<Fractional Beamforming>

An eNB may perform closed-loop precoding with respect to some of precoders for antenna port partitions and linking precoders for linking antenna port partitions and apply one of the following precoding schemes to the other precoders.

1. A precoding scheme defined in a system (hereinafter, default precoding)
2. A precoding scheme pre-designated by an eNB or a network (hereinafter, reference precoding)
3. A precoding scheme randomly set by an eNB (hereinafter, random precoding)

Hereinafter, a set of partitions and/or linking coefficients, to which closed-loop precoding is applied, is referred to as a control space and a set of partitions and/or linking coefficients, to which closed-loop precoding is not applied, is referred to as a non-control space.

The default precoding scheme which is defined in the system refers to a method of defining and using a beam transmitted to the non-control space in the system. Default precoding may be defined to follow an arbitrary open-loop precoding scheme. Default precoding may be differently configured according to system bandwidth, the number of transmit antennas of an eNB, the number of transmission layers (or transmission rank), transmit antenna configurations $N_{t,v}$ and $N_{t,h}$ of an eNB or the number of transmit antennas of a non-control direction. Alternatively, a specific beam may be configured regardless of the system parameters. In addition, default precoding may be fixed over the entire frequency band and time or may be changed in specific time or frequency resource units.

In addition, the reference precoding scheme which is pre-designated by the eNB or the network refers to a method of designating a precoding scheme to be applied to the non-control space with respect to a UE in the eNB or the network. Accordingly, reference precoding information of the non-control space is delivered to the UE via a physical layer or higher layer message. The reference precoding information means all information explicitly or implicitly indicating a MIMO precoder to be applied to the non-control space. For example, a specific index (PMI) of a PMI codebook corresponding to the number of transmit antennas in the non-control space, a quantized value of each element of a MIMO precoding matrix of the non-control space, an index to be used for transmission after indexing a plurality of MIMO precoding schemes may be signaled as reference precoding information.

In addition, reference precoding may change in specific time or frequency resource units. In this case, after a plurality of change patterns is defined according to time/frequency resources of reference precoding, a reference precoding pattern index used in the eNB or the network may be signaled as reference precoding information. Alternatively, the seed value of a random number generator for deriving a change pattern according to time/frequency resources may also be used as reference precoding information. Alternatively, information as to which of various precoding schemes (e.g., STBC, delay diversity, etc.) is used may be used as reference precoding information.

Further, a random precoding scheme which is randomly set by the eNB means a method of arbitrarily determining and applying a precoding scheme to be applied to the non-control space at the eNB. Accordingly, unlike the default precoding scheme or the reference precoding scheme, the UE does not know the precoder to be applied to the non-control space. For example, the eNB may transmit a beam randomly changed in specific time resource units (e.g., OFDM symbols) and/or frequency resource units (e.g., subcarriers) to the non-control space.

In the above-described fractional beamforming schemes, independent partitioning and fractional beamforming schemes are applicable according to transmission layers. Alternatively, the same partitioning and fractional beamforming scheme is applicable to all transmission layers.

The above-described fractional beamforming scheme is suitable for a channel environment in which reliability of feedback information of some transmit antennas or feedback information of linking coefficients decreases or feedback is unnecessary. In particular, when reliability of feedback information of some of transmit antennas or feedback information of linking coefficients decreases, unnecessary packet reception errors and retransmission due to feedback information errors may be prevented and, when feedback is unnecessary, feedback overhead may be minimized.

<Aligned Partitioned Precoding>

If some or all antenna port partitions have the same size and partitioned antenna arrays have similar effective channel properties, the same precoding scheme, that is aligned partitioned precoding, is applicable to NPPs.

FIG. 16 is a diagram showing the shape of a beam according to number of transmit antennas according to an embodiment of the present invention.

As described above, a multi-antenna system such as massive MIMO has evolved and the number of antennas may gradually increase.

Referring to FIG. 16, in a massive MIMO system, PMI feedback for all antenna arrays of an eNB may be performed in closed-loop MIMO transmission. At this time, a specific direction among several beam directions which may be generated by all eNB antennas expressed in the form of a PMI codebook may be fed back as a beam direction most preferred by a UE. At this time, performance sensitivity for feedback may be changed according to the number of antennas. More specifically, referring to Table 6 below and FIG. 16, the shape of a beam transmitted by 4×4 antennas, that is, 16 antennas ((a) of FIG. 16), and the shape of a beam transmitted by 8×8 antennas, that is, 64 antennas ((b) of FIG. 16), may be different. At this time, the shape of the beam may be changed based on beam width, beam gain and beam direction.

At this time, as shown in Table 6 below, max gain of an 8×8 matrix may be greater than that of a 4×4 matrix. In contrast, HPBW E_Plane (°) of the 8×8 matrix may be less than that of the 4×4 matrix. When the number of antennas increases, beam gain increases and beam width may decrease. That is, the beam may become sharper. At this time, when the beam width decreases, PMI measured by the UE and PMI actually transmitted by the eNB are not equal due to spatial influence or small change in channel and thus feedback performance may deteriorate. As described above, sensitivity for feedback may increase. That is, when the number of antennas increases, beam gain may increase but the beam becomes sharper, decreasing the beam width. As the beam width decreases, feedback accuracy may decrease.

TABLE 6

|  | 16Tx Case | 64Tx Case |
| --- | --- | --- |
| Design Frequency(GHz) | 2 | 2 |
| Array config | 4 × 4 | 8 × 8 |
| Antenna dimension(Half Length) | 30 mm | 30 mm |
| Element distance | dx: 75 mm | dx: 75 mm |
|  | dy: 75 mm | dy: 75 mm |
| Fractional bandwidth(MHz) | 1.89 GHz~2.15 GHz(260 Mz) | 1.89 GHz~2.15 GHz(260 Mz) |
| VSWR | Max 2:1 | Max 2:1 |

TABLE 6-continued

|  | 16Tx Case | 64Tx Case |
| --- | --- | --- |
| Radiation Pattern Shape | Directional | Directional |
| Max Gain(GB) | 19.52 | 25.54 |
| Radiation Efficiency(%) | 100% | 100% |
| HPBW E_Plane(°) | 26 | 12 |
| HPBW H_Plane(°) | 24 | 12 |

Accordingly, the eNB may configure and use some antenna arrays as effective antennas as described above in order to improve feedback accuracy or sensitivity. At this time, the eNB may adaptively select a set of effective transmit antennas based on a channel state of each UE. At this time, the set of effective transmit antennas may mean the number of antennas and an index of an antenna port. In addition, adaptively selecting the set of effective transmit antennas may mean that antennas participating in data transmission may be restricted to only some antennas according to the channel state of the UE.

Figure 17:
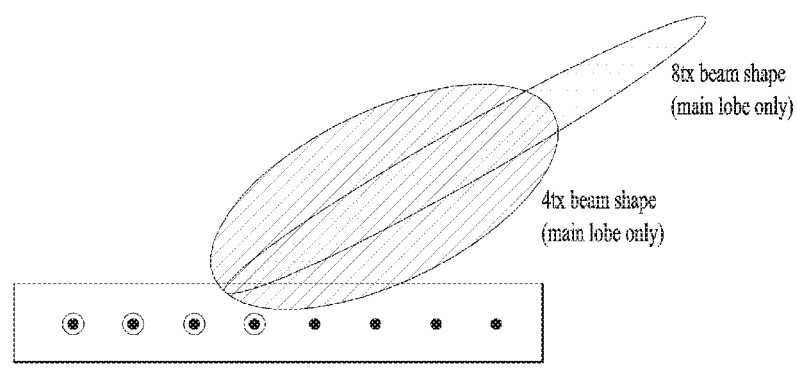
FIG. 17 is a diagram showing the shape of a beam based on the number of effective antennas of a plurality of transmit antennas according to an embodiment of the present invention.

FIG. 17 is a diagram showing the shape of a beam based on the number of effective antennas of a plurality of transmit antennas according to an embodiment of the present invention.

As described with reference to FIG. 16, only some of a plurality of antennas may participate in transmission in a massive MIMO system.

At this time, for example, referring to FIG. 17, transmit antennas arranged in an 8tx linear array may be considered. At this time, the number of antennas used may be changed according to the surrounding environment of the UE. For example, in an environment in which mobility of a UE is low, a surrounding environment is static and an LoS (line of sight) is secured, higher beam gain may be more advantageous in terms of power consumption and data transmission and reception. That is, since mobility of the UE is low and LOS is secured, channel change may be small and thus sensitivity may be low. Accordingly, at this time, even when the beam width decreases, large beam gain may be effective. At this time, beam gain may increase using all eight antennas in FIG. 17.

In contrast, in a non line of sight (NLoS) environment or if mobility of the UE high, that is, if dynamic change in channel around the UE is large, although beam gain increases, when beam width is small, retransmission may be likely to be performed due to packet errors and feedback overhead may increase. At this time, in FIG. 17, when only four antennas are used, beam gain may decrease but beam width may increase. That is, high sensitivity may be set in consideration of channel change, thereby reducing influence of channel change. Therefore, it is possible to prepare for channel change and to reduce packet transmission error probability to decrease feedback overhead. In addition, for example, if dynamic channel change is significant, open-loop MIMO technology may be used, which will be described below.

Figure 18:
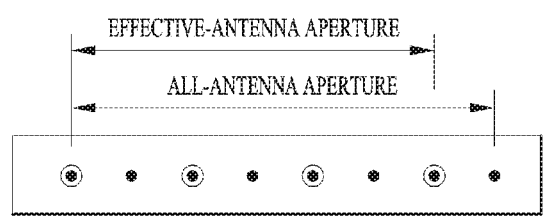
FIG. 18 is a diagram showing an example of a method of configuring an effective antenna of a plurality of transmit antennas according to an embodiment of the present invention.

FIG. 18 is a diagram showing an example of a method of configuring an effective antenna of a plurality of transmit antennas according to an embodiment of the present invention.

As described with reference to FIG. 17, some of a plurality of antennas may be selected to participate in data transmission and reception. At this time, for example, in FIG. 17, four consecutive arrays of linear antenna arrays were selected to participate in data transmission and reception. However, neighboring antennas may not be always configured as effective antenna arrays.

For example, referring to FIG. 18, a UE may configure only four of eight antennas as effective antennas in an NLoS environment, as described above. At this time, for example, if a UE is adjacent to an eNB and thus an SINR is excellent, spatial multiplexing transmission of rank 2 or higher is possible. In such an environment, the number of effective antennas may be reduced while maintaining the aperture of the antenna in consideration of feedback overhead versus performance. That is, a distance between effective antennas may increase to use spatial multiplexing transmission.

At this time, for example, technology for configuring a set of effective antennas is applicable to a two-dimensional array as described above. At this time, for example, the number of effective antennas or the size of the aperture may be controlled independently of vertical or horizontal domain or dimension. That is, a set of effective antennas in the vertical domain or a set of effective antennas in the horizontal domain may be independently set.

In addition, for example, effective transmit antennas may be configured in consideration of signals and channels specified in a UE, such as DMRSs or PDSCHs in an LTE system in ranges of physical signals and channels, to which the set of effective transmit antennas is applicable. In addition, for example, the effective transmit antennas may be configured based on properties influencing the channel between the eNB and the UE. At this time, the properties influencing the channel between the eNB and the UE may include UE mobility, channel Doppler properties, the number and distribution of other UEs located near the UE, LoS/NLoS factor, SINR, etc. That is, effective transmit antennas may be configured based on properties influencing the channel between the eNB and the UE, without being limited to the above-described embodiment.

At this time, in a method of configuring effective transmit antennas based on the above-described properties, the UE may provide the above-described properties to the eNB. The eNB may set the number of effective transmit antennas based on the provided information. For example, the UE may include a position sensor, an acceleration sensor, etc. in order to obtain information on the above-described properties. In addition, the UE may include the sensors for measuring the above-described properties without being limited to the above-described embodiment.

In addition, for example, with respect to the properties influencing the channel, which are used to configure the effective antenna ports, the eNB may acquire information from a wireless-environment database according to the position of the UE in the coverage of the eNB. In addition, the eNB may measure the above-described information through uplink data received from the UE.

In addition, for example, the information on the properties influencing the channel may be fed back per specific frequency region (e.g., subband, sub-carrier, resource block, etc.) in a broadband system. Alternatively, feedback information may be transmitted only at a specific frequency selected by the UE or specified by the eNB, without being limited to the above-described embodiment.

In addition, for example, the above-described frequency regions may be one or more consecutive or inconsecutive frequency regions, without being limited to the above-described embodiment.

As another example, the UE may directly feed back information on the set of effective transmit antennas to the eNB using the above-described properties. That is, the UE may directly determine effective transmit antennas and feed back the information on the determined antennas to the eNB. At this time, for example, the UE may transmit the feedback information including at least one of information on indices of effective transmit antenna ports, a pilot pattern index and the number of antenna ports to the eNB. That is, the UE may transmit index information for enabling some of a plurality of antennas to be configured as the effective transmit antennas and information on the number of effective transmit antennas to the eNB.

For example, referring to Table 7 below, if a total number of eNB antennas is 8, the UE may select a preferred number of antennas from among 2tx, 4tx and 8tx. In addition, the UE may also feed back the index corresponding to the number of antennas in Table 7 below. For example, if the UE uses two antenna ports and prefers ports 0 and 1, information on the number of antennas "2" and index information "0" may be transmitted to the eNB to configure the effective antennas.

TABLE 7

| Index | 2tx | 4tx |
| --- | --- | --- |
| 0 | Port (0, 1) | Port (0, 1, 2, 3) |
| 1 | Port (0, 7) | Port (0, 2, 4, 6) |

That is, feedback of information for configuring the effective transmit antennas between the UE and the eNB may be acquired using various methods, without being limited to the above-described embodiment.

Figure 19:
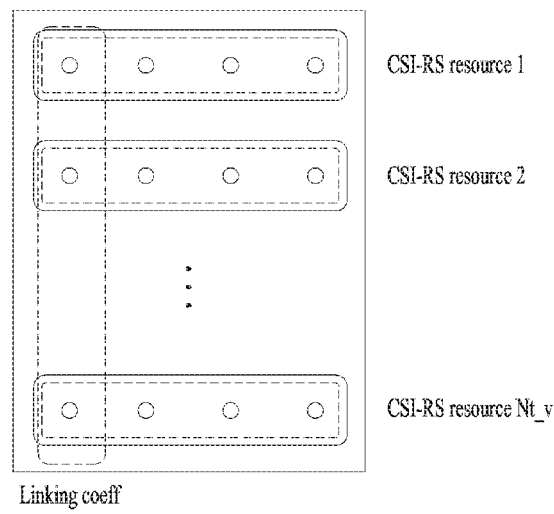
FIGS. 19 and 20 are diagrams illustrating a method of configuring a pilot pattern based on a vertical direction and a horizontal direction according to an embodiment of the present invention.
Figure 20:
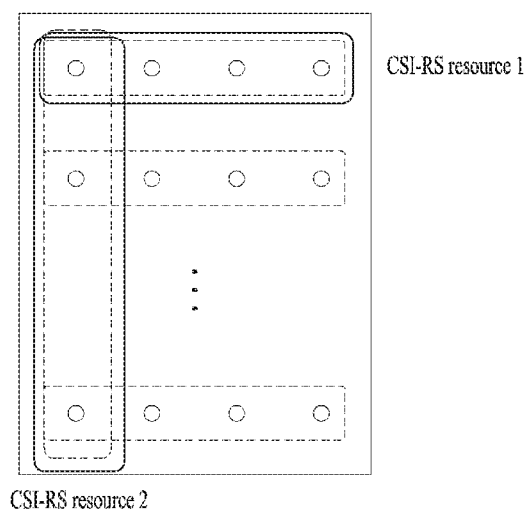

FIGS. 19 and 20 are diagrams illustrating a method of configuring a pilot pattern based on a vertical direction and a horizontal direction according to an embodiment of the present invention.

As described above, the eNB may transmit a pilot signal to the UE using a plurality of pilot patterns in massive MIMO. At this time, for example, antennas may be combined in a horizontal direction (FIG. 19) or a vertical direction (FIG. 20) to be allocated one CSI-RS resource. That is, with respect to the horizontal or vertical antenna arrays, pilot patterns may be formed based on QCL and information on a plurality of pilot patterns may be transmitted to the UE. At this time, as described above, QCL between antenna ports may mean that it may be assumed that some or all of the large-scale properties of a signal received by the UE from one antenna port (or a radio channel corresponding to the antenna port) are equal to some or all the large-scale properties of a signal received from another antenna port (or a radio channel corresponding to the antenna port). In addition, as described above, assume that node #1 including N1 antenna ports transmits CSI-RS resource #1 and node #2 including N2 antenna ports transmits CSI-RS resource #2. In this case, CSI-RS resource #1 is included in QCL mode parameter set #1 and CSI-RS resource #2 is included in QCL mode parameter set #2. Further, the eNB may configure parameter set #1 and parameter set #2 with respect to the UE located in common coverage of node #1 and node #2 through a higher layer signal. Thereafter, the eNB may perform DPS in a manner of configuring parameter set #1 with respect to the UE through node #1 using DCI upon data (that is, PDSCH) transmission and configuring parameter set #2 through node #2 upon data transmission. The UE may assume that CSI-RS resource #1 and DM-RS are QCL when parameter set #1 is configured through DCI and CSI-RS resource #2 and DM-RS are QCL if parameter set #2 is configured. That is, antenna arrays may be formed in a horizontal or vertical direction based on the above description.

For example, if antennas are combined in the horizontal direction to be allocated one CSI-RS resource, a precoder corresponding to a pilot pattern (CSI-RS resource) may correspond to a precoder for performing horizontal beamforming. At this time, a precoder for linking pilot patterns may correspond to a precoder for performing vertical beamforming. At this time, a precoder for linking pilot patterns may be a set of coefficients indicating a difference in phase and size between pilot patterns.

At this time, for example, pilot patterns may be a set of pilot patterns transmitted at the same transmission point. That is, pilot patterns may form a predetermined set based on the same reference point. As another example, each pilot pattern may include the same number of antenna ports. That is, in massive MIMO, each pilot pattern may include the same number of antenna ports based on the horizontal or vertical direction.

Thereafter, the UE may feed back information on the number of antenna ports and/or index to the eNB based on the received pilot pattern information. For example, as described above, the number of antenna ports and/or the index of the antenna port of the pilot pattern information may be set based on the horizontal direction (FIG. 19) or the vertical direction (FIG. 20). At this time, for example, the UE may feed back each pilot pattern as independent information. As another example, the UE may deliver the information on each pilot pattern represented in a commonly applicable representative value. That is, the information on the pilot pattern may be variously represented and fed back.

In addition, the UE may feed back the number of coefficients linking pilot patterns and/or index information. At this time, for example, the number of coefficients linking pilot patterns and/or index information may be set based on the horizontal direction (FIG. 19) or the vertical direction (FIG. 20).

At this time, if the number of antenna ports and/or index information to be included in the pilot pattern is horizontal beamforming information, the number of coefficients linking pilot patterns and/or index information may be vertical beamforming information (FIG. 19). In contrast, if the number of antenna ports and/or index information to be included in the pilot pattern is vertical beamforming information, the number of coefficients linking pilot patterns and/or index information may be horizontal beamforming information (FIG. 20).

Figure 21:
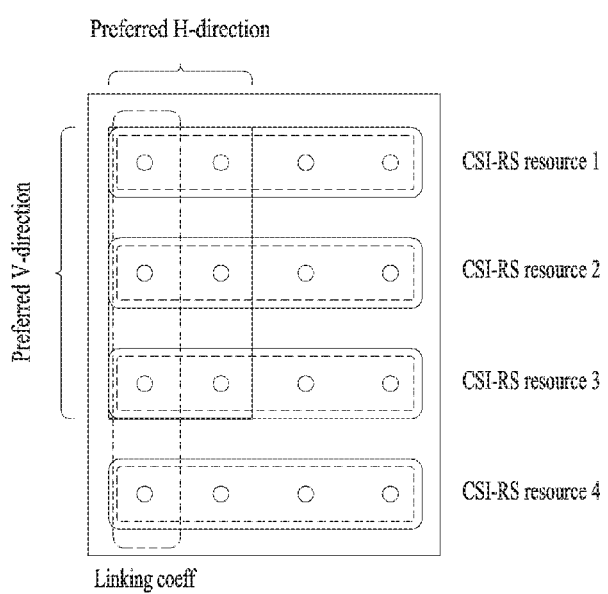
FIG. 21 is a diagram showing an example of a method of configuring partial array beamforming according to an embodiment of the present invention.

FIG. 21 is a diagram showing an example of a method of configuring partial array beamforming according to an embodiment of the present invention.

Referring to FIG. 21, the UE may receive information on the pilot pattern and feed back information on a preferred pilot pattern to the eNB. At this time, for example, the eNB may include 4×4=16 antenna ports. At this time, the eNB may transmit information on four pilot patterns to the UE based on QCL. At this time, the UE may prefer beam width corresponding to two antenna ports in the horizontal direction and beam width corresponding to three antenna ports in the vertical direction. The UE may feed back information on the preferred antenna ports in the horizontal and vertical directions. That is, the UE may set the number of antennas to be included in the pilot pattern to 2 and set a coefficient linking pilot patterns to 3, thereby feeding back the information to the eNB. As another example, if the UE feeds back information on pilot patterns, only a difference may be transmitted, thereby reducing transmission overhead. For example, the UE may set the coefficient linking the pilot patterns to 2 based on the difference to perform feedback, without being limited to the above-described embodiment.

As another example, the UE may feed back a set of indices of preferred antenna ports along with the number of antennas. At this time, the index information may be the index of the antenna port included in the same pilot pattern. In addition, the index information may be the index of the linking coefficient.

That is, the index may be assigned on the assumption of the same pilot pattern or linking coefficient in the horizontal direction and the vertical direction, based on which information on the index and the number of antennas may be fed back. For example, the index may be the start location or last location of the antenna port. That is, the number of effective antennas may be set through the index information and the information on the number of antennas, without being limited to the above-described embodiment. In addition, for example, the UE may further feed back preferred precoder information based on feedback information. At this time, as described above, on the assumption of the same pilot pattern or linking coefficient, a suitable PMI may be transmitted based on the information on the number of antennas. In addition, CSI feedback information such as CQI, RI, etc. may be calculated based on PMI information and feedback information, which will be described below.

Figure 22:
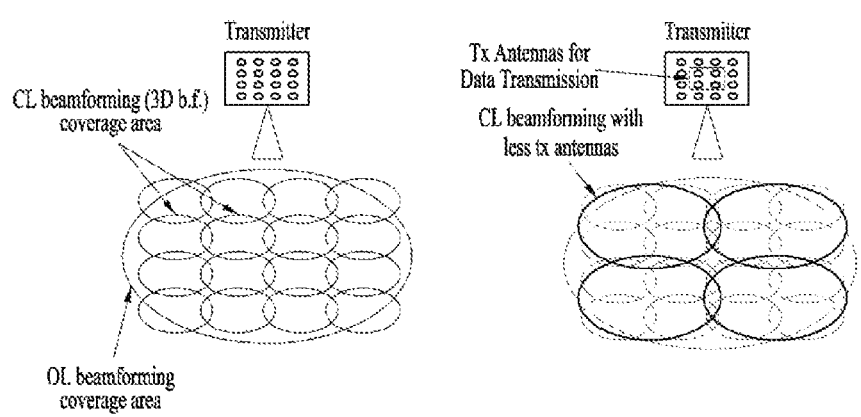
FIG. 22 is a diagram showing comparison in beam coverage between a legacy MIMO transmission scheme and a BA beamforming scheme according to an embodiment of the present invention.

FIG. 22 is a diagram showing comparison in beam coverage between a legacy MIMO transmission scheme and a BA beamforming scheme according to an embodiment of the present invention.

The eNB may measure the properties of an uplink signal and beamforming based on some antenna arrays applied in a channel 3D beamforming environment or the position of the UE may be referred to as beam-width adaptation (BA) beamforming. At this time, in a BA beamforming scheme, the number of antennas participating in data transmission may be adjusted according to the movement speed of the UE, thereby adjusting the transmission beam width. FIG. 22 is a diagram showing comparison in beam coverage between a legacy MIMO transmission scheme and a BA beamforming scheme. In particular, the left side of FIG. 22 shows the legacy MIMO transmission scheme and the right side thereof shows the BA beamforming scheme.

Referring to the left side of FIG. 22, when the UE moves at a medium speed in a 4×4 antenna array, the width of the beam transmitted by the 4×4 antenna array may be too narrow to obtain channel accuracy and may be excessively wide because an open-loop scheme covers overall cell coverage. As shown in the right side of FIG. 22, when only a 2×2 antenna array located at the center participates in transmission, a beam may be generated such that the beam width is relatively wide but beam gain can be obtained. That is, the number of antennas of the UE participating in transmission is reduced according to the movement speed of the UE, thereby increasing beam width. Therefore, it is possible to acquire beam gain less than that of closed-loop beamforming but greater than that of open-loop beamforming.

Figure 23:
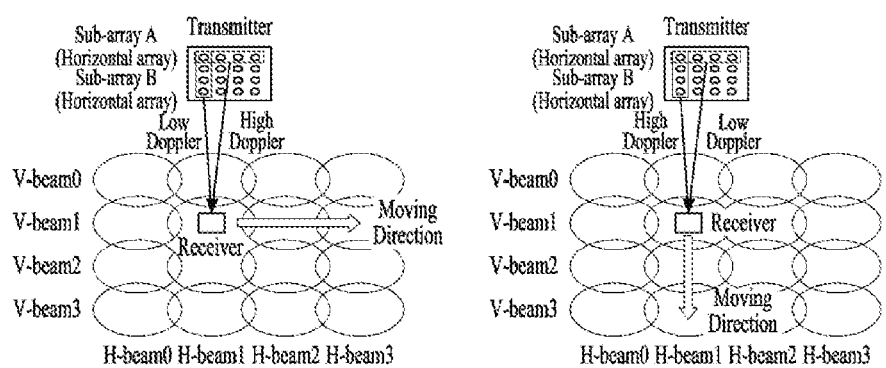
FIG. 23 is a diagram showing the concept of a DA beamforming scheme according to an embodiment of the present invention.

FIG. 23 is a diagram showing the concept of a DA beamforming scheme according to an embodiment of the present invention.

In BA beamforming, the beam width is adjusted according to mobility of the UE. However, a method of performing beamforming in a vertical or horizontal direction according to the movement direction of the UE and performing open-loop precoding in the other direction may be considered. This technology may be referred to as dimension adaptation (DA) beamforming because 2D beamforming is performed in a 3D beamforming environment.

In the DA beamforming, the eNB applies an open-loop scheme to a direction in which mobility of the UE is high, that is, a direction in which Doppler effect is high, between the vertical and horizontal directions of the UE and applies a closed-loop scheme to the other direction. FIG. 23 shows the concept of the DA beamforming scheme. In particular, the left side of FIG. 23 shows the case where the UE moves in the horizontal direction and the right side thereof shows the case where the UE moves in the vertical direction.

Figure 24:
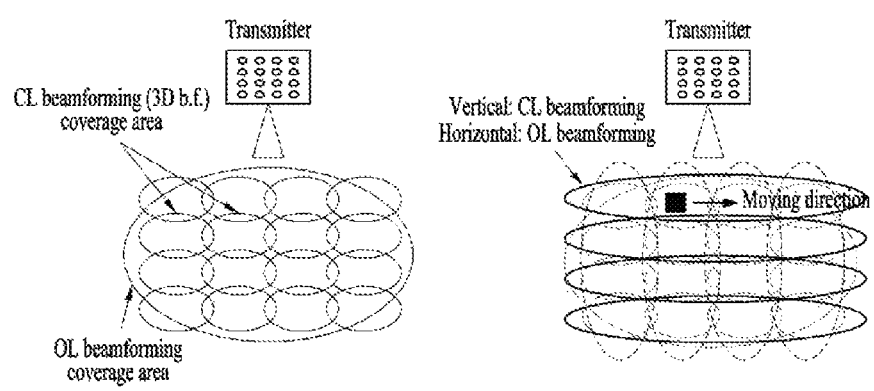
FIG. 24 is a diagram showing the features of a DA beamforming scheme according to an embodiment of the present invention.

FIG. 24 is a diagram showing the features of a DA beamforming scheme according to an embodiment of the present invention.

If the DA beamforming scheme is used, beam gain can be obtained in a direction in which Doppler effect is low and cannot be obtained in a direction in which Doppler effect is high. Accordingly, the region of the generated beam has a narrow width only in one of the horizontal and vertical directions as shown in FIG. 24. Accordingly, beam gain having a predetermined level may be given to a UE moving in a specific direction.

Figure 25:
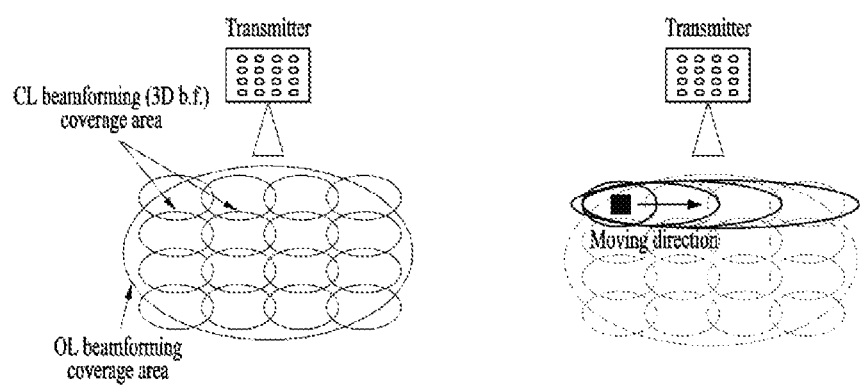
FIG. 25 is a diagram showing the concept of a DBA beamforming scheme according to an embodiment of the present invention.

FIG. 25 is a diagram showing the concept of a DBA beamforming scheme according to an embodiment of the present invention.

A dimension and beam-width adaptation (DBA) beamforming scheme as a combination of a DA beamforming scheme and a BA beamforming scheme may be considered. FIG. 25 shows the concept of the DBA beamforming scheme. The DBA beamforming scheme is a combination of a DA beamforming scheme and a BA beamforming scheme. Referring to FIG. 25, upon applying DBA beamforming, if a UE moves in a vertical or horizontal direction, closed-loop beamforming is performed in a direction in which the Doppler effect is low, that is, in a direction orthogonal to movement of a UE, and the number of antennas participating in transmission is adjusted according to the speed of the UE to adjust beam width in a direction in which Doppler effect having a predetermined level is present. In summary, as shown in Table 1 below, the DA beamforming scheme is suitable when a UE moves at high speed in a specific direction with respect to an eNB, the BA beamforming scheme is suitable when a UE moves at low speed or medium speed, and the DBA beamforming scheme is suitable when a UE moves in a specific direction at low speed or medium speed.

TABLE 8

| | |
|---|---|
| Dimension Adaptation Beamforming | A UE moves at high speed in a vertical or horizontal direction with respect to an eNB. |
| Beam-width Adaptation Beamforming | A UE moves at low speed or medium speed. |
| DBA Beamforming (DA + BA) | A UE moves in a vertical or horizontal direction with respect to an eNB at low speed or medium speed. |

BA beamforming or DBA beamforming is characterized in that the beam width is controlled according to channel change properties and, more particularly, movement of the UE, that is, the movement speed of the UE. In order to control the beam width, antenna ON/OFF and per-antenna transmit power and phase control technology may be used. In the present invention, a precoder cycling scheme having a limited beamforming range is proposed as another scheme of controlling beam width. The precoder cycling scheme of the present invention is characterized in that beam coverage is decreased due to precoder cycling as the movement speed of the UE decreases and is increased as the movement speed of the UE increases. Here, the beam coverage may mean the range of a beamforming angle of the cycled precoder.

Figure 26:
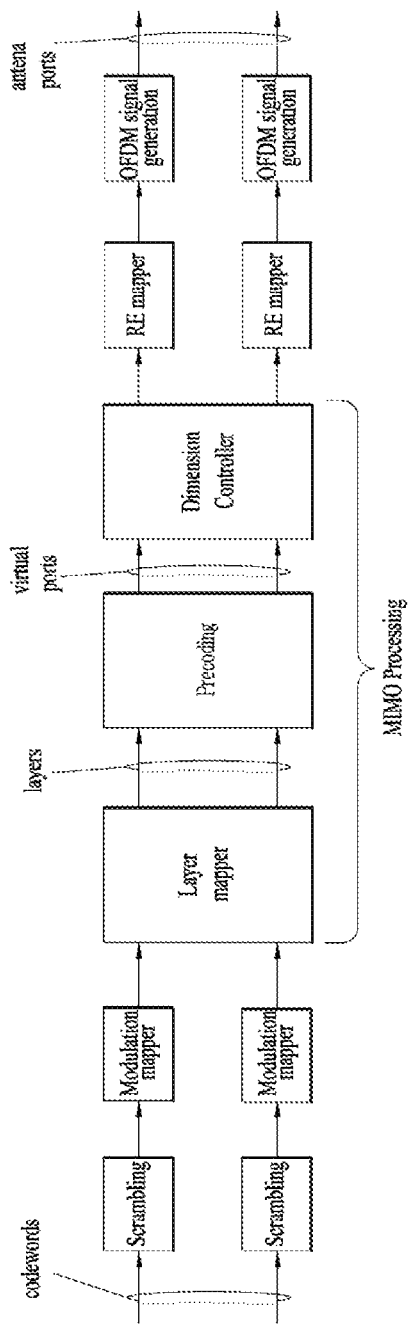
FIG. 26 is a diagram showing a multi input multi output (MIMO) transmission structure according to an embodiment of the present invention.

FIG. 26 is a diagram showing a multiple input multiple output (MIMO) transmission structure according to an embodiment of the present invention.

Referring to FIG. 26, a MIMO transmission structure may be obtained by adding a dimension controller to the transmission structure of a legacy LTE system. That is, in a downlink MIMO transmission structure, transmission of massive MIMO may be supported through virtual port matching after precoding. Hereinafter, assume that a total number of transmission layers is M, a total number of CSI-RS ports is Nc, and a total number of virtual ports is Nx. If an eNB includes a two-dimensional antenna array, a total number of CSI-RS ports transmitted in an antenna row direction is Nc_h, and a total number of CSI-RS ports transmitted in an antenna column direction is Nc_v. The numbers of ports controlled by the dimension controller are respectively Nx_h and Nx_v in the row and column directions.

At this time, the dimension controller maps Nc CSI-RS ports or newly measured RS ports (hereinafter, referred to as eCSI-RS ports) corresponding thereto to Nx virtual ports. In the case of the 2D antenna array, Nc_h eCSI-RS ports are mapped to Nx_h horizontal virtual ports, and Nc_v eCSI-RS ports are mapped to Nx_v vertical virtual ports.

At this time, for example, the dimension controller may configure Equations 20 and 21 below using a matrix having a horizontal-direction size of Nc_h×Nx_h and a matrix having a vertical-direction size of Nc_v×Nx_v. That is, the dimension controller may be used for matching between the CSI-RS ports and the virtual ports after precoding.

$$D\_h(Nc\_h, Nx\_h) = \frac{\sqrt{Nc\_h}}{\sqrt{Nx\_h}} \begin{bmatrix} I_{Nx\_h,Nx\_h} \\ 0_{(Nc\_h-Nx\_h),Nx\_h} \end{bmatrix} \quad \text{[Equation 21]}$$

$$D\_v(Nc\_v, Nx\_v) = \frac{\sqrt{Nc\_v}}{\sqrt{Nx\_v}} \begin{bmatrix} I_{Nx\_v,Nx\_v} \\ 0_{(Nc\_v-Nx\_v),Nx\_v} \end{bmatrix} \quad \text{[Equation 22]}$$

In the above equations, $I_{m,m}$ denotes a unit matrix having a size of m×m, and $O_{n,m}$ denotes a zero matrix having a size of n×m. At this time, the values Nx_h and Nx_v may be values reported from the UE to the eNB and, in some cases, may be corrected by the eNB or may be arbitrarily set.

In addition, for example, a 3D MIMO precoding method may be configured as shown in Equation 23 below through a Kronecker product if a precoding vector for an i-th transmission layer is $u_i$, a horizontal precoding vector is $c_i$, and a vertical precoding vector is $r_i$.

$$u_i = r_i \otimes c_i \quad \text{[Equation 23]}$$

At this time, the 3D MIMO precoder for all transmission layers may be configured as Equation 24 below through a Khatri-Rao product (column-wise Kronecker product) of a horizontal precoding matrix C and a vertical precoding matrix R.

$$U = [r_1 \otimes c_1 \ldots r_M \otimes c_M] = R * C \quad \text{[Equation 24]}$$

At this time, the sizes of the horizontal and vertical matrices may be Nx_h×M and Nx_v×M, respectively.

As described above, pilot information of a 2D antenna array may be transmitted to the UE using a plurality of pilot patterns based on QCL. At this time, as described above, a horizontal domain and a vertical domain may be respectively information on a precoder for a pilot pattern and a precoder for linking pilot patterns, and vice versa.

At this time, the UE may transmit feedback information to the eNB using the pilot information of the 2D antenna array received from the eNB. At this time, the information fed back by the UE may include first information as information indicating closed-loop beamforming or open-loop beamforming for the vertical domain or the horizontal domain and second information as information on a set of effective transmit antennas if closed-loop beamforming is preferred. At this time, the information on the set may be information on the number of antenna ports and index information of the port as described above.

In addition, for example, the first information may include information on a MIMO channel composed of antenna ports belonging to pilot patterns and indication information of a channel, in which closed loop transmission is preferred, among MIMO channels composed of coefficients linking the pilot patterns. At this time, for example, the MIMO channel composed of the antenna ports belonging to the pilot patterns may be an average of the MIMO channels estimated by the pilot patterns. In addition, a determination as to whether closed-loop/open-loop beamforming for each MIMO channel is performed based on the pilot pattern may be individually or wholly indicated information.

In addition, for example, the first information may be indication information of a channel, in which closed-loop transmission is preferred, of pilot patterns.

In addition, for example, the first information and the second information may be implemented by distinguishable fields. As another example, the first information and the second information may be represented as one information field.

As another example, the UE may feed back information indicating whether closed-loop transmission or open-loop transmission is preferred in the horizontal domain or the vertical domain, the number of antenna ports of the channel and/or the index information. That is, the UE may differently set the feedback method according to the horizontal domain and the vertical domain. At this time, for example, if closed-loop transmission is set in the horizontal domain, the UE may transmit the number of antenna ports and/or antenna index set information for the horizontal domain.

In addition, for example, if open-loop transmission is desired in the horizontal domain, the UE may transmit the number of antenna ports and/or the antenna index set information as a null set. That is, if the field for the antenna port or the antenna index set has a value of 0, it can be seen that open-loop transmission is desired, without being limited to the above-described embodiment.

As described above, the closed-loop transmission mode or the open-loop transmission mode may be selected in the horizontal domain or the vertical domain.

For example, the closed-loop transmission mode may be set to any one of 3D beamforming, V-only beamforming and H-only beamforming. At this time, 3D beamforming may be a transmission mode wherein the closed-loop transmission mode is applied to the horizontal and vertical domains to perform feedback. In addition, V-only beamforming may be a transmission mode wherein the open-loop transmission mode is applied to the horizontal domain and applying the closed-loop transmission mode to the vertical domain. H-only beamforming may be a transmission mode wherein the open-loop transmission mode is applied to the vertical domain and the closed-loop transmission mode is applied to the horizontal domain. At this time, as shown in Table 9 below, CSI feedback information configuration may be changed according to transmission mode.

TABLE 9

| Transmission mode | CSI feedback information configuration |
|---|---|
| Open loop | CQI, RI, ($N_{x\_v}$, $N_{x\_h}$)[1] |
| Closed loop | V-PMI, H-PMI, CQI, RI, $N_{x\_v}$, $N_{x\_h}$, (A-PMI)[2] |
| V-only beamforming | V-PMI, CQI, RI, $N_{x\_v}$, ($N_{x\_h}$)[1] |
| H-only beamforming | H-PMI, CQI, RI, $N_{x\_h}$, ($N_{x\_v}$)[1] |

At this time, "1)" may indicate that omission is possible when an eNB specifies a transmission mode. That is, the part denoted by "1)" may not always be necessary and may be optionally included.

For example, if each transmission mode is individually specified in the form of an LTE transmission mode, the item denoted by 1 may be omitted upon configuring feedback information according to the transmission mode. In contrast, if the above-described transmission modes are flexibly applied within a single transmission mode, the item denoted by 1 may be included.

For example, information may be composed of $N_{x\_v}$=C and $N_{x\_h}$=C if a UE prefers open-loop MIMO transmission, may be composed of $N_{x\_h}$=C if a V-only beamforming is preferred, and may be composed of $N_{x\_v}$=C if H-only beamforming is preferred. Here, the C value means that open-loop MIMO transmission is preferred in the corresponding direction, is predetermined between the eNB and the UE, and may be any value out of a range of 2 to $N_{c\_i}$ (where, i=h or v). (ex1: C=1, ex2: C=100). That is, the part denoted by "1" may be additionally used or omitted, without being limited to the above-described embodiment.

In addition, for example, information $N_{x\_v}$ and $N_{x\_h}$ may be used as other information. For example, a new index x may be defined according to the range of $N_{x\_i}$ (i being v or h) preferred by the UE. (ex. x=1: $N_{x\_i}$=1 to 2, x=2: $N_{x\_i}$=3 to 5, . . . ). In addition, A-PMI (augmented PMI) information may be included upon calculating feedback information.

More specifically, the UE may feed back CSI based on the following steps. At this time, the UE acquires information Nc, $N_{c\_h}$ and $N_{c\_v}$ as CSI feedback configuration information and performs channel estimation for the vertical and horizontal domains based on the acquired information. At this time, based on the estimated channel information, in consideration of UE mobility, optimal $N_{x\_v}$ and $N_{x\_h}$ values are found. At this time, the dimension controllers may determine $D_h$ and $D_v$.

At this time, for example, the $N_{x\_v}$ value or the $N_{x\_h}$ value may be C. That is, the open-loop transmission mode is applicable to a specific direction. At this time, for example, the PMI/RI may be determined by applying a predetermined open-loop mode to a direction, in which the open-loop transmission mode is applied, and may be determined based on the dimension controller from a PMI codebook in a direction, in the closed-loop transmission scheme is applied.

At this time, when the closed-loop transmission mode is applied to both the vertical and horizontal domains, the PMI/RI for each direction may be configured based on the dimension controller. Thereafter, the RI may be determined by a specific function value of H-RI for the horizontal direction and V-RI for the vertical direction. At this time, for example, the specific function may be set based on Equation 25 or 26 below.

$$RI = \max(V\text{-}RI, H\text{-}RI) \qquad \text{[Equation 25]}$$

$$RI = \min(V\text{-}RI, H\text{-}RI)) \qquad \text{[Equation 26]}$$

Thereafter, the PMI may be a value equal to the RI determined by Equation 25 or 26 above between the PMI for the vertical direction and the PMI for the horizontal direction. At this time, the above-described A-PMI may be set by obtaining the PMI for a specific direction again after fixing an RI value or may be set based on a difference between the PMI for the specific direction and the RI value. For example, the size of the A-PMI may be composed of an Nx_j×(RI-j-RI) matrix. At this time, j may be a vertical or horizontal direction.

Thereafter, a precoding matrix is generated using the PMI and RI for the vertical or horizontal direction, thereby calculating CQI.

As described above, if 3D beamforming is applied in massive MIMO, CSI may be fed back in consideration of beamforming for the horizontal direction and the vertical direction.

Hereinafter, the embodiments of the present invention will be described in consideration of 3D beamforming, V-only beamforming and H-only beamforming.

For example, CSI may be periodically fed back through a PUCCH or may be aperiodically transmitted through a PUSCH. At this time, in 3D beamforming, CSI is fed back in consideration of beamforming for the vertical and horizontal directions and thus the amount of information to be fed back may be large. More specifically, in 3D beamforming, CSI for both the horizontal and vertical directions is fed back and thus the amount of feedback information may be increased. At this time, if the CSI is transmitted through the PUCCH, CSI shall be fed back using a restricted amount of resources and there is a limitation in the amount of resources. In addition, overhead may increase as the amount of feedback information increases.

Accordingly, an efficient CSI feedback mode needs to be configured in consideration of horizontal and vertical beamforming. At this time, CSI feedback for horizontal beamforming may be a horizontal domain. In addition, CSI feedback for vertical beamforming may be a vertical domain.

At this time, as described above, CSI may be broadly divided into three pieces of information such as RI (Rank Indicator), PMI (Precoding Matrix Index) and CQI (Channel Quality Indication). At this time, the RI indicates rank information of a channel as described above and means the number of streams capable of being received by the UE through the same frequency-time resources. In addition, the RI is determined by long term fading of the channel and thus may be fed back to the eNB at a longer period than the PMI and the CQI. In addition, the PMI may include the spatial properties of the channel and indicate a precoding matrix index of an eNB preferred by the UE based on a metric such as an SINR. In addition, the CQI indicates the intensity of the channel and may generally mean a reception SINR capable of being obtained when the eNB uses the PMI. In addition, for example, in LTE-A, a final PMI may be divided into W1 which is a long term and/or wideband PMI and W2 which is a short term and/or subband PMI, without being limited to the above-described embodiment.

At this time, the CSI feedback mode may be configured based on the PMI and CQI feedback type of the above-described CSI. That is, in order to feed back the CSI using a restricted amount of resources, the feedback mode may be configured based on the attributes or properties of the CSI to be fed back.

More specifically, the CSI feedback mode may be configured as shown in Table 9 below in consideration of a legacy LTE system. At this time, the number of the following "Mode" is arbitrarily set and is not limited to the following embodiment. In addition, the configuration included in each mode may be one embodiment and is not limited to the following embodiment.

TABLE 10

| | | PMI Feedback type | | |
|---|---|---|---|---|
| | | NO PMI | Single PMI | Dual PMI |
| CQI Feedback Type | Wideband | Mode 1-0 RI Wideband CQI | Mode 1-1-1(Horizontal beamforming) RI Wideband CQI Wideband H-PMI Mode 1-1-2(Vertical beamforming) RI Wideband CQI Wideband V-PMI | Mode 1-2 Horizontal domain: H-RI, 1st WB H-CQI, 2nd WB H-CQI for RI > 1, WB H-PMI Vertical domain: V-RI, 1st WB V-CQI, 2nd WB V-CQI for RI > 1, WB V-PMI 3D domain: 1st WB 3D-CQI, 2nd WB 3D-CQI for RI > 1 |
| | UE-Selected | Mode 2-0 RI Wideband CQI Best-1 CQI | Mode 2-1-1(Horizontal beamforming) RI Wideband CQI Best-1 CQI Wideband H-PMI Mode 2-1-2(Vertical beamforming) RI Wideband CQI Best-1 CQI Wideband V-PMI | Mode 2-2 Horizontal domain, WB: H-RI, 1st WB H-CQI, 2nd WB H-CQI for RI > 1, WB H-PMI, Horizontal domain, UE selected band: best-1 H-CQI in each BP, best-1 H-CQI for RI > 1, best-1 indicator Vertical domain, WB: V-RI, 1st WB V-CQI, 2nd WB V-CQI for RI > 1, WB V-PMI Vertical domain, UE selected band: best-1 V-CQI in each BP, best-1 V-CQI for RI > 1, |

TABLE 10-continued

| PMI Feedback type | | |
|---|---|---|
| NO PMI | Single PMI | Dual PMI |
| | | best-1 indicator<br>3D domain<br>1st WB 3D-CQI, 2nd WB<br>3D-CQI for RI > 1. |

The CSI feedback mode may be determined based on the PMI feedback type and the CQI feedback type. At this time, the PMI may be divided into modes in which the PMI is not included (Mode 1-0, 2-0), modes including only PMI for the horizontal direction or vertical direction (Mode 1-1-1, 1-1-2, 2-1-1, 2-1-2), and modes including PMIs for the horizontal and vertical directions (Mode 1-2, 2-2). In addition, the CSI feedback mode may be divided into modes for feeding back only a wideband CQI (Mode 1-0, 1-1-1, 1-1-2, 1-2) and modes for feeding back up to a UE-selected CQI (Mode 2-0, 2-1-1, 2-1-2, 2-2) based on the CQI feedback type.

That is, the CSI feedback mode may be configured according to the PMIs for horizontal beamforming and vertical beamforming in consideration of a 3D beamforming environment.

At this time, in each mode, the modes in which the PMI is not included (Mode 1-0, 2-0) may be defined even in a legacy LTE system and selected when feedback is performed based on the open-loop transmission mode. That is, the PMI may not be included in the fed-back information and Mode 1-0 in which only the wideband CQI is fed back and Mode 2-0 in which the wideband CQI and the most preferred CQI information are fed back may be configured based on the CQI feedback type.

Next, CSI feedback transmission modes (Mode 1-1-1, 1-1-2, 2-1-1, 2-1-2) in which only the PMI for the horizontal direction or the vertical direction is transmitted may be configured. At this time, for example, in an environment, to which 3D beamforming is applied, the CSI feedback transmission mode in which only one PMI is transmitted may be a mode in which only PMI information for any one of vertical beamforming and horizontal beamforming is fed back.

At this time, for example, if the closed-loop transmission mode is applied to horizontal beamforming and the open-loop transmission mode is applied to vertical beamforming, only the PMI for the horizontal direction may be included in CSI feedback information to be fed back to the eNB. At this time, in Table 10 above, this may be Mode 1-1-1 or Mode 2-1-1. At this time, for example, Mode 1-1-1 may be a mode in which the wideband CQI is fed back and Mode 2-1-1 may be a mode in which the UE-selected CQI is fed back, that is, the wideband CQI and the CQI information of the most preferred band are fed back. In addition, for example, the CQI may be a 3D-CQI considering both the horizontal and vertical directions. In addition, the CQI is a CQI for the horizontal direction, to which the closed-loop transmission mode is applied, and may be an H-CQI. That is, the CQI may be selectively determined as necessary and is not limited to the above-described embodiment.

In contrast, if the closed-loop transmission mode is applied to vertical beamforming and the open-loop transmission mode is applied to horizontal beamforming, only the PMI for the vertical direction may be included in CSI feedback information to be fed back to the eNB. At this time, in Table 10 above, this may be Mode 1-1-2 or Mode 2-1-2.

At this time, for example, Mode 1-1-2 may be a mode in which the wideband CQI is fed back and Mode 2-1-2 may be a mode in which the UE-selected CQI is fed back, that is, the wideband CQI and the CQI information of the most preferred band are fed back. In addition, for example, the CQI may be 3D-CQI considering the horizontal and vertical directions. In addition, the CQI is a CQI for the vertical direction, to which the closed-loop transmission mode is applied, and may be a V-CQI. That is, the CQI may be selectively determined as necessary and is not limited to the above-described embodiment.

For example, as described above, the CQI transmitted in the mode in which only PMI information for one of horizontal or vertical beamforming may be included to feed back the CSI may be CQI information for one direction, similarly to the PMI. As another example, the CQI may be a 3D-CQI independently of the horizontal or vertical direction, as described above.

Next, the CSI feedback mode may be modes in which the PMIs for the horizontal and vertical directions are transmitted (Mode 1-2, 2-2). At this time, if only the wideband CQI is transmitted, Mode 1-2 may be set. In addition, if the wideband CQI and the CQI of the preferred band are transmitted, Mode 2-2 may be set.

At this time, for example, as Mode 1-2, if the PMIs for both the horizontal and vertical directions are transmitted, the transmitted PMI information may include at least one of fields for a horizontal domain, a vertical domain and a 3D domain. At this time, for example, as shown in Table 10, the field for the horizontal domain may include information on an H-RI, H-CQI and H-PMI. In addition, for example, the PMI is not necessarily composed of only one index and may be composed of two or more indices. In addition, the PMI may be transmitted in a state of being divided into a first WB H-PMI and a second WB H-PMI, without being limited to the above-described embodiment.

In addition, for example, the field for the vertical domain may include information on a V-RI, V-CQI and V-PMI. In addition, for example, the PMI is not necessarily composed of only one index and may be composed of two or more indices. In addition, the PMI may be transmitted in a state of being divided into a first WB V-PMI and a second WB V-PMI, without being limited to the above-described embodiment.

In addition, for example, the 3D domain field may include information on a 3D-CQI. At this time, for example, if 3D-CQI information is included in the 3D domain field, the horizontal and vertical CQI information may be selectively included. That is, the horizontal and vertical CQI information may be omitted. At this time, if final 3D-CQI information is fed back, the CQI information for each direction may not be necessary and thus may be omitted.

As another example, as Mode 2-2, if the UE selected CQI is further fed back, fields for a wideband horizontal domain, a wideband vertical domain, a UE selected horizontal domain, a UE selected vertical domain and a 3D domain may be included. At this time, for example, the wideband horizontal domain, the wideband vertical domain and the 3D domain may be equal to the horizontal domain, the vertical domain and the 3D domain described in Mode 1-2.

At this time, for example, the UE selected horizontal domain may include at least one of H-CQI information for the band preferred by the UE and indicator information for the band preferred by the UE.

In addition, for example, the UE selected vertical domain may include at least one of V-CQI information for the band preferred by the UE and indicator information for the band preferred by the UE.

That is, a field based on information on the band preferred by the UE may be further included, without being limited to the above-described embodiment.

Although the CSI includes two PMIs, that is, PMIs for horizontal and vertical directions in the above description and Table 10, the present invention is not limited thereto. More specifically, a single PMI for a CSI may be configured in an environment, to which 3D beamforming is applied. At this time, a mode in which PMI information for any one of the horizontal or vertical direction is fed back may be a mode in which information on a portion of a single PMI is fed back. That is, partial PMI feedback may be performed. At this time, even when a single PMI is configured in consideration of the status of the UE or eNB, a portion of the PMI may be efficiently fed back and thus the above-described feedback mode may be used as a partial PMI feedback mode. In addition, similarly, in Table 10 above, the mode in which the PMIs for the horizontal and vertical directions are fed back may be a mode in which a single PMI including configurations for the horizontal and vertical directions is transmitted, without being limited to the above-described embodiment.

In addition, for example, although the above-described CSI feedback is described as being periodically transmitted through the PUCCH, the CSI feedback may be aperiodically transmitted. The above-described configuration is similarly applicable to the case where the CSI is fed back through the PUSCH.

Figure 27:
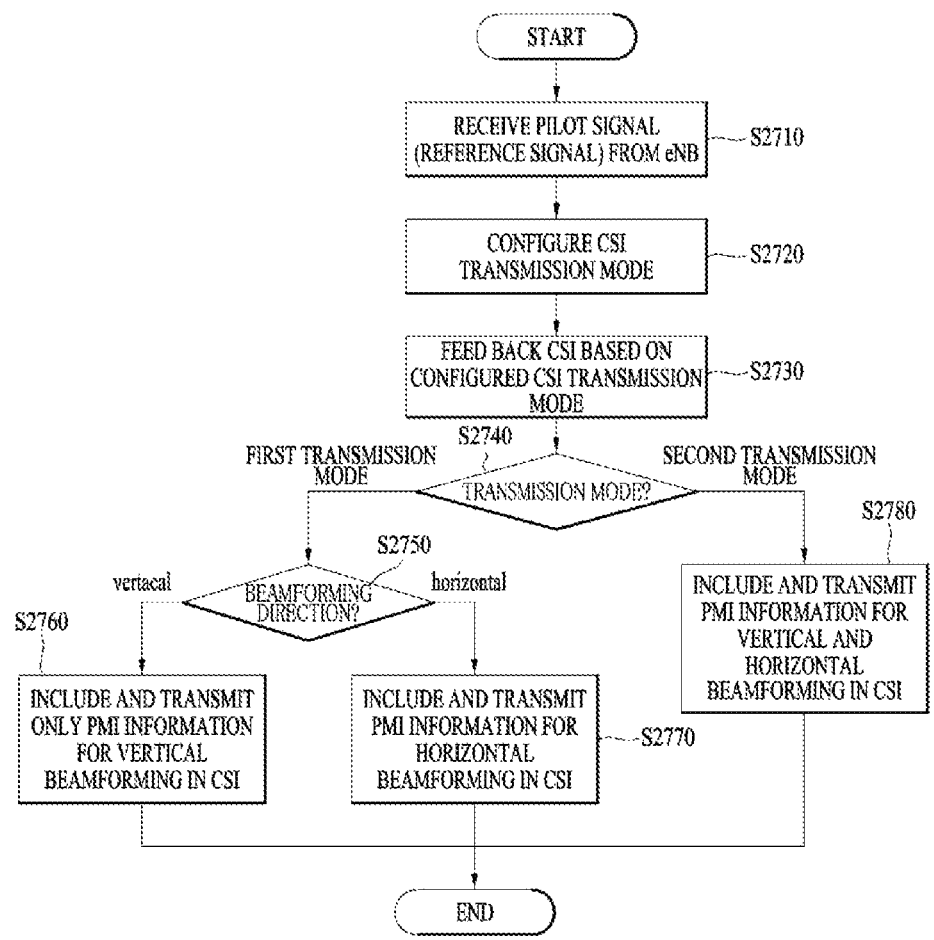
FIG. 27 is a flowchart illustrating a method of feeding back CSI when 3D beamforming is applied according to an embodiment of the present invention.

FIG. 27 is a flowchart illustrating a method of feeding back CSI when 3D beamforming is applied according to an embodiment of the present invention.

The UE may receive a pilot signal (reference signal) from the eNB (S2710). As this time, as described above with reference to FIGS. 19 to 21, the pilot signal may be received with respect to an antenna array configured per pilot pattern based on QCL. Next, the UE may configure a CSI transmission mode (S2720) and feed back CSI based on the configured CSI transmission mode (S2730). Next, the UE may determine a transmission mode (S2740).

At this time, for example, if an entity for configuring the CSI transmission mode is an eNB, the eNB may configure a CSI transmission mode and transmit a pilot signal to the UE. Thereafter, the UE may feed back CSI based on the configured CSI transmission mode. That is, the entity for configuring the CSI transmission mode may be changed, without being limited to the above-described embodiment. At this time, if a first transmission mode is configured, the UE may determine a beamforming direction (S2750). At this time, the first transmission mode may be a transmission mode in which PMI information for any one of vertical beamforming or horizontal beamforming is fed back, as described above with reference to FIG. 26.

At this time, the UE may include only PMI information for vertical beamforming in the CSI and transmit the CSI (S2760) or include only PMI information for horizontal beamforming in the CSI and transmit the CSI (S2770). That is, as described above with reference to FIG. 26, the UE feeds back only the PMI information for any one of vertical beamforming and horizontal beamforming. In this case, the closed-loop transmission mode is applied to one direction and the open-loop transmission mode is applied to the other direction, as described above.

Next, if a second transmission mode is configured, the UE may include PMI information for both horizontal beamforming and vertical beamforming in the CSI and transmit the CSI (S2780). At this time, as described above with reference to FIG. 26, if PMI information for both horizontal beamforming and vertical beamforming is transmitted, at least one of the horizontal domain, vertical domain and 3D domain may be included as described above.

Figure 28:
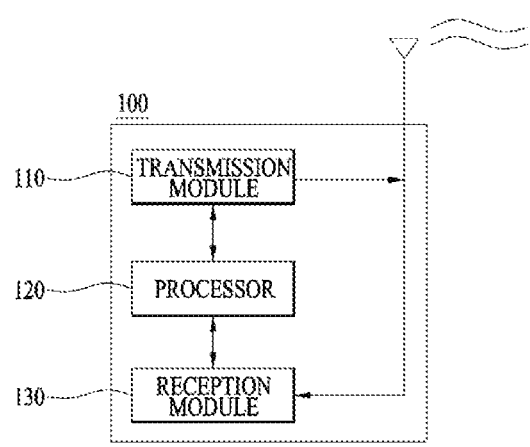
FIG. 28 is a block diagram of a UE device according to an embodiment of the present invention.

FIG. 28 is a block diagram of a UE device according to an embodiment of the present invention.

A UE device may feed back CSI.

At this time, the UE device 100 may include a transmission module 110 for transmitting a radio signal, a reception module 130 for receiving a radio signal, and a processor 120 for controlling the transmission module 110 and the reception module 130. At this time, the UE device 100 may perform communication with an external device using the transmission module 110 and the reception module 130. At this time, the external device may be another UE device. In addition, the external device may be an eNB. That is, the external device may be a device capable of performing communication with the UE device 100, without being limited to the above-embodiment. The UE device may transmit and receive digital data such as content using the transmission module 110 and the reception module 130. That is, the UE device 100 may perform communication using the transmission module 110 and the reception module 130 to exchange information with the external device.

According to the embodiment of the present invention, the processor 120 of the UE device may receive a pilot signal (reference signal) from the eNB using the reception module 130 in a wireless communication system, to which 3D beamforming is applied. Thereafter, the processor 120 may configure a CSI transmission mode and feed back CSI based on the configured CSI transmission mode using the transmission module 110. At this time, the CSI transmission mode may include a first transmission mode in which PMI information for any one of vertical beamforming and horizontal beamforming is transmitted and a second transmission mode in which PMI information for both vertical beamforming and horizontal beamforming is transmitted. The CSI may be fed back based on any one of the first transmission mode and the second transmission mode. At this time, for example, the first transmission mode may be any one of a first CQI transmission mode in which a wideband CQI is included and transmitted in the CSI and a second CQI transmission mode in which a UE-selected CQI is included and transmitted in the CSI. For example, the second transmission mode may be any one of a first CQI transmission mode in which a wideband CQI is included and transmitted in the CSI and a second CQI transmission mode in which a UE-selected CQI is included and transmitted in the CSI. In addition, for example, if a PMI for vertical beamforming is transmitted in the first transmission mode, at least one of a 3D-CQI and a V-CQI may be included in the CSI, and, if a PMI for horizontal beamforming is transmitted in the first transmission mode, at least one of a 3D-CQI may be included in the CSI and an H-CQI. In the second transmission mode, the 3D-CQI may be always included in the CSI and the V-CQI and the H-CQI may be selectively included in the CSI. In addition, for example, if a PMI included in PMI information is transmitted based on the first transmission mode, any one of a first PMI for vertical beamforming and a second PMI for a horizontal direction is transmitted and, if a PMI included in PMI information is transmitted based on the second transmission mode, both a first PMI for vertical beamforming and a second PMI for a horizontal direction may be transmitted. At this time, the first PMI and the second PMI may be portions of a single PMI, the first transmission mode may be transmission mode in which a portion of the single PMI is fed back in consideration of a beamforming direction, and the second transmission mode may be a mode in which the single PMI is transmitted. That is, the PMI transmitted through the first transmission mode and the second transmission is a single PMI and the partial information of the PMI is fed back in the first transmission mode, as described above.

The embodiments of the present invention can be implemented by a variety of means, for example, hardware, firmware, software, or a combination thereof.

In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both apparatus and method inventions may be complementarily applied to each other.

INDUSTRIAL APPLICABILITY

Although an example of applying a method of configuring a reference signal for three-dimensional (3D) MIMO and a device therefor in a wireless communication system to a 3GPP LTE system is described, the present invention is applicable to various wireless communication systems in addition to the 3GPP LTE system.

[Sequence List Free Text]

What is claimed is:

1. A method of feeding back channel state information (CSI) by a user equipment (UE) in a wireless communication system applied three-dimensional (3D) beamforming, the method comprising:
receiving a pilot signal (reference signal) from a base station;
configuring a CSI transmission mode in one of a first transmission mode or a second transmission mode;
feeding back a set of antenna index for vertical beamforming and a set of antenna index for horizontal beamforming; and
feeding back a CSI based on the configured CSI transmission mode,
wherein the first transmission mode includes precoding matrix index (PMI) information for any one of the vertical beamforming or the horizontal beamforming,
wherein the second transmission mode includes PMI information for both the vertical beamforming and the horizontal beamforming, and
wherein the set of antenna index for a beamforming requesting an open loop transmission is an empty set.

2. The method according to claim 1, wherein the first transmission mode is any one of a first channel quality indicator (CQI) transmission mode in which a wideband CQI is included and transmitted in the CSI or a second CQI transmission mode in which a UE-selected CQI is included and transmitted in the CSI.

3. The method according to claim 1, wherein the second transmission mode is any one of a first channel quality indicator (CQI) transmission mode in which a wideband CQI is included and transmitted in the CSI or a second CQI transmission mode in which a UE-selected CQI is included and transmitted in the CSI.

4. The method according to claim 1,
wherein at least one of a 3D-CQI or a V-CQI is included in the CSI when a PMI for vertical beamforming is transmitted in the first transmission mode, and
wherein at least one of a 3D-CQI or an H-CQI is included in the CSI when a PMI for horizontal beamforming is transmitted in the first transmission mode.

5. The method according to claim 1,
wherein, in the second transmission mode, a 3D-CQI is always included in the CSI, and a V-CQI and an H-CQI are selectively included in the CSI.

6. The method according to claim 1, wherein the CSI is periodically fed back through a physical uplink control channel (PUCCH) or is aperiodically fed back through a physical uplink shared channel (PUSCH).

7. A user equipment (UE) device for feeding back channel state information (CSI) in a wireless communication system, to which three-dimensional (3D) beamforming is applied, the UE device comprising:
a receiver configured to receive information from an external device;
a transmitter configured to transmit information to an external device; and
a processor configured to control the receiver and the transmitter,
wherein the processor is configured to:
control the receiver to receive a pilot signal (reference signal) from a base station;
configure a CSI transmission mode in one of a first transmission mode and a second transmission mode;

control the transmitter to feed back a set of antenna index for vertical beamforming and a set of antenna index for horizontal beamforming; and
control the transmitter to feed back the CSI based on the configured CSI transmission mode,
wherein the first transmission mode includes precoding matrix index (PMI) information for any one of the vertical beamforming or the horizontal beamforming,
wherein the second transmission mode includes PMI information for both the vertical beamforming and the horizontal beamforming, and
wherein the set of antenna index for a beamforming requesting an open loop transmission is an empty set.

8. The UE device according to claim 7, wherein the first transmission mode is any one of a first channel quality indicator (CQI) transmission mode in which a wideband CQI is included and transmitted in the CSI or a second CQI transmission mode in which a UE-selected CQI is included and transmitted in the CSI.

9. The UE device according to claim 7, wherein the second transmission mode is any one of a first channel quality indicator (CQI) transmission mode in which a wideband CQI is included and transmitted in the CSI or a second CQI transmission mode in which a UE-selected CQI is included and transmitted in the CSI.

10. The UE device according to claim 7,
wherein at least one of a 3D-CQI or a V-CQI is included in the CSI when a PMI for vertical beamforming is transmitted in the first transmission mode, and
wherein at least one of a 3D-CQI or an H-CQI is included in the CSI when a PMI for horizontal beamforming is transmitted in the first transmission mode.

11. The UE device according to claim 7,
wherein, in the second transmission mode, a 3D-CQI is always included in the CSI, and a V-CQI and an H-CQI are selectively included in the CSI.

* * * * *